US008711842B2

United States Patent
Knappe

(10) Patent No.: US 8,711,842 B2
(45) Date of Patent: Apr. 29, 2014

(54) DISTRIBUTED IP-PBX SIGNAL PROCESSING

(75) Inventor: Michael Knappe, Morgan Hill, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 397 days.

(21) Appl. No.: 12/850,288

(22) Filed: Aug. 4, 2010

(65) Prior Publication Data

US 2012/0033661 A1 Feb. 9, 2012

(51) Int. Cl.
*H04L 12/66* (2006.01)

(52) U.S. Cl.
USPC .................................................. 370/352

(58) Field of Classification Search
USPC .................. 370/352, 356, 248, 419, 442; 379/265.12; 455/406
See application file for complete search history.

(56) References Cited

U.S. PATENT DOCUMENTS

| | | | |
|---|---|---|---|
| 7,088,814 B1 * | 8/2006 | Shaffer et al. ............ | 379/265.12 |
| 7,197,030 B2 * | 3/2007 | Witchalls ................. | 370/356 |
| 7,599,355 B2 * | 10/2009 | Sunstrum ................. | 370/352 |
| 7,688,810 B2 * | 3/2010 | Khasnabish .............. | 370/352 |
| 7,843,954 B2 * | 11/2010 | Reesor et al. ............ | 370/419 |
| 2004/0042480 A1 * | 3/2004 | Sproat et al. ............. | 370/442 |
| 2005/0180397 A1 * | 8/2005 | Yeom ...................... | 370/352 |
| 2007/0297339 A1 * | 12/2007 | Taylor et al. ............. | 370/248 |
| 2009/0262725 A1 * | 10/2009 | Chen et al. ............... | 370/352 |
| 2010/0075630 A1 * | 3/2010 | Tillitt et al. .............. | 455/406 |
| 2012/0027006 A1 * | 2/2012 | Snow et al. .............. | 370/352 |

* cited by examiner

*Primary Examiner* — Asad Nawaz
*Assistant Examiner* — Parth Patel
(74) *Attorney, Agent, or Firm* — Shumaker & Sieffert, P.A.

(57) ABSTRACT

Techniques are described by which an IP telephone system leverages the digital signal processing functions of end-user IP telephones by distributing signal processing tasks typically carried out by a centralized IP-PBX. The end-user IP telephones publicize their signal processing capabilities and availabilities to an IP-PBX, which maintains a resource capability mapping of the IP telephones. When the IP-PBX receive a bitstream for a communication session involving IP telephones and/or legacy phones of the IP telephone system, the IP-PBX determines the signal processing requirements for the bitstream, selects an available, capable IP telephone to perform the requirements, and distributes the bitstream to the selected IP telephone. The IP telephone performs the requisite signal processing and returns the processed bitstream to the IP-PBX, which forwards the processed bitstream to the destination endpoint for the communication session.

29 Claims, 9 Drawing Sheets

DISTRIBUTED IP-PBX SIGNAL PROCESSING

TECHNICAL FIELD

The invention relates to telephony and, more specifically, to voice data processing within a packet-based telephony network.

BACKGROUND

Deploying Internet Protocol (IP) telephone systems allow enterprises and individuals to transport voice communication over a packet-based network and thereby avoid leasing traditional circuit-switched telephone lines that constitute the public switched telephone network (PSTN). Beyond voice communication, IP telephony provides extensive voice and data services, including instant messaging, call waiting, caller identification, and conferencing, as well as connectivity to legacy telephone networks.

IP telephone systems, such as an IP Private Branch eXchange (IP-PBX) phone system that comprises an IP-PBX and one or more IP telephones, include coder-decoders (codecs) to convert analog waveforms into a digital bitstream for transmission over an IP network and to reconstruct analog waveforms from a digital bitstream received via the IP network. In addition to analog-to-digital and digital-to-analog conversion, IP telephone systems provide signal processing functionality to voice calls, including voice compression/decompression, echo cancellation, silence suppression, and teleconference mixing. For example, individual IP telephones include codecs to provide signal processing functionality for endpoint use. An IP-PBX gateway coupling the IP telephone system to the PSTN and/or analog telephones also include dedicated codecs to provide signal processing functions to bridge traditional voice and digital bitstream voice networks.

SUMMARY

In general, techniques are described by which an IP telephone system leverages the digital signal processing functions of end-user IP telephones by distributing signal processing tasks typically carried out by a centralized IP-PBX. A resource manager of the IP telephone system manages digital signal processing functions of the individual endpoint IP telephones as a network of distributed signal processing resources. For example, techniques are described in which the IP telephone system identifies a digital bitstream that requires processing to carry out IP telephony functionality within the system, such as a digital bitstream captured from an analog signal of a legacy phone that a centralized IP-PBX would typically process and convert for introduction into the IP telephone system. Instead of fully processing the digital bitstream in a centralized manner with the codecs of the IP-PBX, the system directs the digital bitstream to, for instance, an idle IP telephone having available digital signal processing capacity and directs the IP telephone to process the digital bitstream using its digital signal processing resources. Upon completing the signal processing task, the IP telephone returns the processed digital bitstream to the IP telephone system.

In one example implementation, the resource manager is integrated within an IP-PBX and includes a database that describes current availability and capabilities of re-targetable, geographically distributed signal processing resources (e.g., endpoint IP telephones) of the IP telephone system. An interface to software integrated on the distributed resources enables the central resource manager to update the database according to changes in the status of the distributed resources, such as when individual endpoint IP phones are busy servicing calls. The central resource manager receives signal processing tasks from elements of the IP telephone system, including the IP-PBX, and distributes each task to a distributed resource that is both available and capable of completing the task. After completing a task, a distributed resource returns processed digital data to the central resource manager for further processing and/or relay to a destination device.

In one embodiment, the invention is directed to a method comprising the steps of receiving, with an internet protocol (IP) telephony device, a signal processing capability description that specifies one or more signal processing capabilities for a first IP telephone DSP resource connected to the IP telephony device via a network communication link, and storing the signal processing capability description to the IP telephony device. The method further comprises the steps of receiving, with the IP telephony device, communication session parameters in a signaling protocol message for the communication session, wherein the communication session parameters specify a signal processing requirement for communication session data associated with the communication session, and receiving, with the IP telephony device, a bitstream for the communication session that comprises communication session data. The method also comprises generating a signal processing task comprising signal processing task parameters that describes the signal processing requirement and identifies the bitstream, determining, from the signal processing capability description, the first IP telephone DSP resource is capable of performing the signal processing requirement, and, based at least on the determination that the first IP telephone DSP resource is capable of performing the signal processing requirement, sending the signal processing task to the first IP telephone DSP resource. The method further comprises the steps of directing the bitstream from the IP telephony device to the first IP telephone DSP resource, receiving, with the IP telephony device, a first processed bitstream generated by the first IP telephone DSP resource in accordance with the signal processing task parameters, and sending the first processed bitstream to a destination device for the communication session.

In one embodiment, the invention is directed to a method comprising the steps of sending a signal processing capability description that specifies one or more signal processing capabilities for an Internet Protocol (IP) telephone from the IP telephone to an IP telephony device via a network communication link. The method further comprises receiving, with the IP telephone, a signal processing task having signal processing task parameters that identifies a bitstream and describes a signal processing requirement for the bitstream, and receiving the bitstream with the IP telephone. The method also includes the steps of applying one of the signal processing capabilities of the IP telephone to perform the signal processing requirement for the bitstream to generate a processed bitstream, and outputting the processed bitstream.

In another embodiment, the invention is directed to an Internet Protocol (IP) telephony device comprising a central resource manager having a set of one or more resource mappings, a network interface, and a resource interface to receive a signal processing capability description that specifies one or more signal processing capabilities for a first IP telephone DSP resource connected to the IP telephony device via a network communication link, wherein the resource interface stores the signal processing capability description to the set of resource mappings. The IP telephony device additionally comprises a call agent having a signaling stack to receive communication session parameters in a signaling protocol message for the communication session, wherein the communication session parameters specify a signal processing requirement for communication session data associated with the communication session, and a data stream stack to receive, via the network interface, a bitstream that comprises communication session data for the communication session. The IP telephony device additionally comprises a task manager to generate a signal processing task comprising signal processing task parameters that describes the signal processing requirement and identifies the bitstream, wherein the task manager uses the signal processing capability description stored to the set of resource mappings to determine the first IP telephone DSP resource is capable of performing the signal processing requirement. The IP telephony device additionally comprises a task interface to, based at least on the determination that the first IP telephone DSP resource is capable of performing the signal processing requirement, sending the signal processing task to the first IP telephone DSP resource, wherein the task manager directs the bitstream to the first IP telephone DSP resource via the network interface, wherein the data stream stack receives, via the network interface, a first processed bitstream generated by the first IP telephone DSP resource in accordance with the signal processing task parameters, and wherein the task manager directs the first processed bitstream to a destination device for the communication session.

In another embodiment, the invention is directed to an IP telephone comprising a central resource manager interface having a resource interface to send a signal processing capability description that specifies one or more signal processing capabilities for the IP telephone from the IP telephone to an IP telephony device via a network communication link. The IP telephone further comprises a task interface to receive a signal processing task having signal processing task parameters that identifies a bitstream and describes a signal processing requirement for the bitstream, a network interface, and a data stream stack to receive, via the network interface, the bitstream. The IP telephone also includes a task manager, and a digital signal processing resource that executes an algorithm to apply one of the signal processing capabilities of the IP telephone to perform the signal processing requirement for the bitstream to generate a processed bitstream, wherein the task manager directs the data stream stack to output, via the network interface, the processed bitstream.

In another embodiment, the invention is directed to a system comprising an IP telephone and an IP private branch exchange (IP-PBX). The IP-PBX comprises a central resource manager having a set of one or more resource mappings, a first network interface, and a first resource interface to receive a signal processing capability description that specifies one or more signal processing capabilities for the IP telephone connected to the IP-PBX via a network communication link, wherein the first resource interface stores the signal processing capability description to the set of resource mappings. The IP-PBX also includes a call agent having a signaling stack to receive communication session parameters in a signaling protocol message for the communication session, wherein the communication session parameters specify a signal processing requirement for communication session data associated with the communication session, and a first data stream stack to receive, via the first network interface, a bitstream that comprises communication session data for the communication session. The IP-PBX further comprises a first task manager to generate a signal processing task comprising signal processing task parameters that describes the signal processing requirement and identifies the bitstream, wherein the first task manager uses the signal processing capability description stored to the set of resource mappings to determine the IP telephone is capable of performing the signal processing requirement. The IP-PBX also comprises a first task interface to, based at least on the determination that the IP telephone is capable of performing the signal processing requirement, sending the signal processing task to the IP telephone, wherein the first task manager directs the bitstream to the IP telephone via the first network interface, wherein the first data stream stack receives, via the first network interface, a first processed bitstream generated by the IP telephone in accordance with the signal processing task parameters, and wherein the first task manager directs the first processed bitstream to a destination device for the communication session. The IP telephone comprises a central resource manager interface having a second resource interface to send the signal processing capability description to the IP-PBX via the network communication link, and a second task interface to receive a signal processing task having signal processing task parameters that identifies a bitstream and describes a signal processing requirement for the bitstream. The IP telephone further includes a second network interface, a second data stream stack to receive, via the second network interface, the bitstream, and a second task manager. The IP telephone also comprises a digital signal processing resource that executes an algorithm to apply one of the signal processing capabilities of the IP telephone to perform the signal processing requirement for the bitstream to generate a processed bitstream, wherein the task manager directs the second data stream stack to output, via the second network interface, the processed bitstream to the IP-PBX.

The techniques described in this disclosure may provide one or more advantages. For example, an IP telephone system typically includes a number of IP telephones that have idle signal processing resources during extended periods of non-use. The described techniques enable the IP telephone system to better utilize already-existing resources and avoid adding dedicated signal processing resources. In addition, because an IP-PBX gateway is often required to simultaneously perform large numbers of signal processing tasks for multiple voice calls, distributing the tasks to pre-existing elements of the IP telephone system may allow the system administrator to forgo a resource-intensive IP-PBX in favor of a simplified, lower-cost model. Furthermore, the techniques may enable IP telephones to share tasks with one another such that not every IP telephone requires advanced capabilities to present such advanced capabilities to a respective user. Rather, more simple IP telephones can distribute to an advanced phone those tasks that require an advanced capability and thereby leverage the advanced capabilities of their high-performance peers. In addition, adding more IP telephones automatically increases the amount of available signal processing resources.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
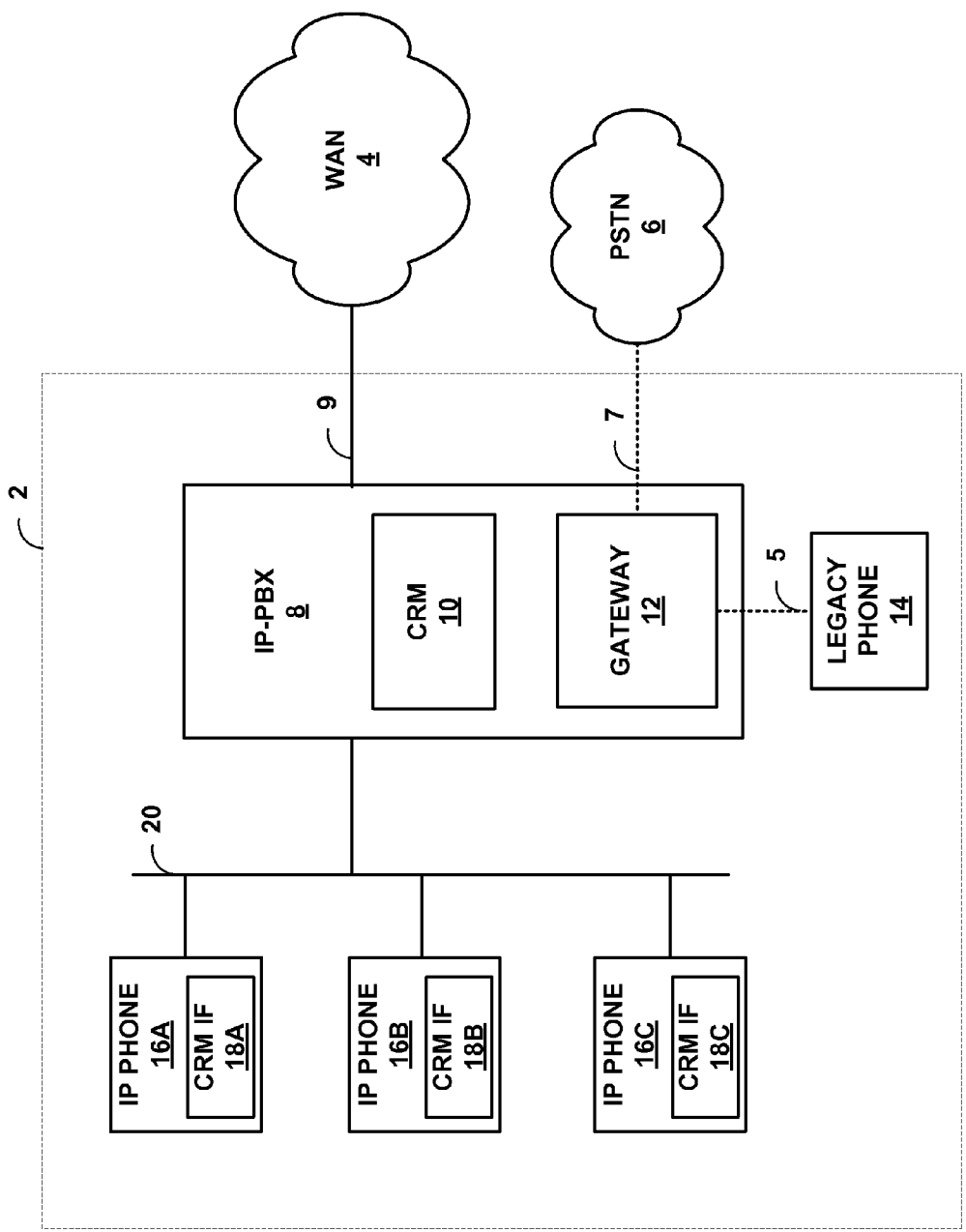
FIG. 1 is a block diagram illustrating an exemplary Internet Protocol (IP) telephone system having an IP-PBX that distributes signal processing tasks to re-targetable digital signal processing (DSP) resources according to the techniques of this disclosure.

FIG. 1 is a block diagram illustrating an exemplary Internet Protocol (IP) telephone system 2 that performs techniques of this disclosure to enable voice calls and other services among users of the system. IP telephone system 2 includes IP-capable Private Branch eXchange 8 ("IP-PBX 8") communicatively coupled via local area network 20 ("LAN 20") to IP telephones 16A-16C ("IP phones 16") and via analog line 5 to legacy phone 14. LAN 20 comprises one or more network communication links that interconnects network devices on the LAN. IP telephone system 2 may comprise an enterprise campus voice network for intra-campus communication. IP-PBX 8 may be a centralized or distributed IP telephony device that comprises one or more servers to run call processing and switching applications to facilitate communication sessions in which various ones of IP telephones 16 and legacy phone 14 are participants. A communication session may include a voice call, a conference call, a data service such as caller identification, directory services, voicemail and the like, and other services. In various example embodiments, IP-PBX 8 may be a dedicated telecommunications equipment chassis, another network device such as a router, or a modular card insertable within a network device chassis. In some embodiments, IP-PBX 8 is an SRX series services gateway manufactured by Juniper Networks, Inc. of Sunnyvale, Calif.

IP-PBX 8 is communicatively coupled to Wide Area Network 4 ("WAN 4") via network link 9 to establish and manage communication sessions between one or more devices within IP telephone system 2 and/or coupled to IP telephone system 2 via WAN 4 or Public Switched Telephone Network 6 ("PSTN 6"). WAN 4 may comprise leased communication lines, a circuit-switched network, a packet-switched network such as the Internet or a virtual private network (VPN), or some combination thereof. WAN 4 may transport data for the communication sessions over IP, Frame Relay, Asynchronous Transfer Mode (ATM), Ethernet, and or another protocol. IP-PBX 8 may be deployed by an enterprise on an enterprise network (e.g., LAN 20) to enable IP telephone system 2 to deliver voice calls and other services among geographically distributed enterprise campuses over WAN 4. In some embodiments, IP-PBX 8 is a PBX hosted by a service provider or network operator. In some embodiments, IP-PBX 8 uses a Centrex service. In some embodiments, IP telephone system 2 includes a session border controller (SBC) and/or a firewall or other intrusion/prevention device that couples to WAN 4 via network link 9 to mediate traffic and communication sessions between WAN 4 and IP-PBX 8.

IP-PBX 8 is additionally communicatively coupled to Public Switched Telephone Network 6 ("PSTN 6") via trunk 7 and to legacy phone 14 via line 5. PSTN 6 is a circuit-switched network that carries signaling data and telephone calls over a plurality of channels. Trunk 7 is a transmission link capable of carrying a plurality of channels (i.e., digital signals) between IP-PBX and PSTN 6 that are aggregated using, for example, time-division multiplexing (TDM). Trunk 7 may include, for instance, a T1 or E1 line. Legacy phone 14 is a traditional analog/TDM phone and line 5 may comprise, for example, a (Plain Old Telephone Service) POTS local loop. IP-PBX 8 switches legacy phone 14 and telephones connected to IP-PBX 8 via PSTN 6. That is, IP-PBX 8 uses signaling data provides by these telephones to create a connection, using an internal switching network and/or crossbar switch, between the telephones and other telephones or devices, including intermediate devices such as IP-PBX 8. In some embodiments, PSTN 6 is a private circuit-switched network that couples IP-PBX 8 to another telephone system.

IP telephones 16 establish communication sessions with other devices to enable voice calls, conference calls, and other data transmission using Voice over IP (VoIP) control protocols. Each of IP telephones 16 may be an IP telephone or a softphone, such as a personal computer, handheld device, mobile phone, or gaming console that is VoIP-capable. IP telephones 16 support one or more VoIP control protocols, such as H.323, Session Initiation Protocol (SIP), Media Gateway Control Protocol (MGCP), and H.248/Megaco, to establish communication sessions with other devices.

IP-PBX 8 comprises gateway 12 to interoperate with PSTN 6 and legacy phone 14 to provide a translation, or conversion, between IP and Time-division multiplexing (TDM)/Pulse Code Modulation (PCM) signaling protocol and communication data for communication sessions carried by PSTN 6 to external TDM devices and communication sessions in which legacy phone 14 participates. Gateway 12 also supports VoIP control protocols to establish communication sessions with IP-capable devices, such as IP telephones 16 or devices connected to IP telephone network 2 via WAN 4. Gateway 12 stitches together circuit-switched aspects of a communication session operating over PSTN 6 or link 5 with packet-switched aspects of a communication session operating over LAN 20 or WAN 4 to create an end-to-end communication session between a VoIP-capable device and a TDM device. In some embodiments, gateway 12 is a circuit-card module insertable within the IP-PBX 8 platform. In some embodiments, gateway 12 is a separate network device, such as a dedicated media gateway or a computer executing VoIP software.

A communication session may comprise a Real-time Transport Protocol (RTP) session operating over LAN 20 and/or WAN 4 to transport communication data between endpoints, which include IP-PBX 8 or one of IP phones 16. The RTP session is carried by a transport protocol (such as Transmission Control Protocol (TCP) or User Datagram Protocol (UDP)) running on a network layer protocol (e.g, IP). IP phones 16 each include analog-to-digital converters and a coder-decoder (codec) to convert analog voice signals to RTP packet streams for transmission to destination devices. Upon receiving RTP packets, IP phone 16 codecs decode the application-layer payload data (i.e., the digital voice data) received during RTP sessions and a digital-to-analog converter convert decoded digital bitstream to analog voice signals for output via a speaker, for example.

IP phones 16 additionally include digital signal processing resources that enable IP phones 16 to provide one or more signal processing features to enhance a user experience, increase transmission efficiencies, or perform other processing functions. For instance, IP phones 16 may perform echo cancellation to improve a user experience as well as voice compression/decompression for voice data to reduce bandwidth utilization over LAN 20 and/or WAN 4. As another example, IP phone 16A may be a high-performance phone that performs silence suppression and teleconference mixing.

Similarly, gateway 12 converts voice data received in a TDM channel of link 5 or trunk 7 to an RTP stream for transmission to a destination device. Gateway 12 includes digital signal processing resources that allow gateway 12 to provide additional signal processing capabilities to communication sessions, such voice compression/decompression, echo cancellation, silence suppression, and teleconference mixing. Furthermore, IP-PBX 8 may connect to another IP telephone system, via WAN 4, that uses a set of encoding techniques on voice data to generate RTP packets for transmission that are not available to IP phones 16. For example, IP telephone system 2 may use the International Telecommunication Unit (ITU) G.711 64 kbit/s codec, while the other IP telephone system uses the ITU G.723.1 6.3 kbit/s codec. Upon receiving an RTP packet stream for a communication session involving one of IP phones 16 and an endpoint device on the other IP telephony system, IP-PBX 8 transcodes the voice data to conform to the ITU G.711 codec used by IP telephone system 2. IP-PBX 8 may then forward the transcoded voice data to one of IP phones 16 in an RTP packet stream.

In accordance with the techniques of this disclosure, IP-PBX 8 additionally comprises central resource manager 10 ("CRM 10") to monitor and manage the availability and capabilities of re-targetable digital signal processing (DSP) resources within IP phones 16 and gateway 12. CRM 10 generates signal processing tasks, such as directives to perform transcoding or echo cancellation for a communication session bitstream, and distributes the tasks via LAN 20 to available, capable DSP resources within IP phones 16 or gateway 12. A communication session bitstream may comprise an RTP packet stream. A signal processing task is a digital signal processing routine to be performed on a bitstream. A signal processing task may be defined by task parameters, which may comprise an identity of a codec, transcoding function, or other DSP resource that a receiving one of IP phones 18 is to apply to the bitstream, as well as deadline, priority, forwarding information, bitstream identifiers, and other data parameters to direct an operation of one of IP phones 18 with respect to a bitstream.

The targeted DSP resources receive the signal processing task and complete the task as assigned before returning the processed data to CRM 10. Gateway 12 obtains the processed data from CRM 10 for further processing and/or forwarding to an endpoint device of the corresponding communication session. In this way, CRM 10 offloads, to idle DSP resources, signal processing tasks that would otherwise be performed by gateway 12 or another dedicated resource.

In some embodiments, CRM 10 is an internal proxy for IP telephone system 2. That is, CRM 10 intermediates between elements of IP telephone system 2 and external elements so as to receive bitstreams for communication session involving IP phones 16A and/or legacy phone 14. CRM 10 may then redirect the bitstreams, along with signal processing tasks, to IP phones 16 for processing. In some embodiments, CRM 10 replicates a bitstream to multiple ones of IP phones 16 for processing according to the same signal processing task. In this way, CRM 10 promotes simultaneous, redundant processing and may receive multiple redundant processed bitstreams from IP phones 16. If one of the redundant processing IP phones 16 encounters a processing failure, CRM 10 may continue to maintain an uninterrupted communication session using a remaining redundant processed bitstream. An IP phone 16 may encounter a processing failure when, for example, the IP phone receives an incoming call request or a user picks up the handset to indicate an impending outbound call request, thus causing the IP phone to stop processing the signal processing task to focus processing on the incoming/outgoing call. That is, the IP phone may need to immediately utilize DSP resources for a call in which the IP phone participates, prevent the IP phone from further processing the signal processing task. Redundant processing using multiple ones of IP phones 16 enables CRM 10 to failover to a redundant processed bitstream from a backup one of IP phones 16 to maintain an uninterrupted communication session.

According to the described techniques, each of IP phones 16 comprises a respective one of central resource manager interfaces 18A-18C (illustrated as "CRM IF" 18A-18C). For example, IP phone 16A comprises CRM interface 18A. CRM interfaces 18 interact with CRM 10 of IP-PBX 8 to expose the available DSP resources on each of IP phones 16. CRM interfaces and CRM 10 communicate over LAN 20 using a network communication protocol, such as TCP/IP, to carry application messages. For example, CRM interface 18A may send CRM 10 an indication of the DSP capabilities of IP phone 16A, including performance and algorithmic capabilities. CRM interface 18A may send CRM 10 a description of IP phone 16A DSP chipset properties, of the central processing unit (CPU), and of a list of codecs, transcoding functions, and other routines stored by IP phone 16A in main memory, as firmware in a programmable read-only memory (PROM) or ROM, or in some other tangible computer-readable storage medium. In some instances, CRM interfaces 18 receive codecs, transcoding functions, and other routines from CRM 10 with which to upgrade the DSP capabilities of corresponding IP phones 16. For example, CRM interface 18A may receive a transcoding function, in the form of a bit file or other compilation of computer-readable instructions. CRM interface 18A may install the transcoding function into a digital signal processor firmware of IP phone 16A, store the function in main memory for IP phone 16 to be executed by a CPU of IP phone 16A, or otherwise make the transcoding function available as a signal processing resource of IP phone 16A.

CRM interfaces 18 additionally send status updates to CRM 10 to provide an indication of the availability of DSP resources on corresponding IP phones 16. If, for example, IP phone 16A receives a control protocol packet requesting a communication session (e.g., a voice call), CRM interface 18A may send CRM 10 a message indicating IP phone 16A DSP resources are unavailable. Conversely, when the communication session terminates, IP phone 16A may send CRM 10 a message indicating IP phone 16A DSP resources are free. As another example, if IP phone 16A is upgraded with new firmware, CRM interface 18A may send CRM 10 a description of the DSP resources (e.g., codec identifiers) provided by the new firmware. As another example, IP phone 16A may send CRM 10 a message indicating IP phone 16A is currently engaged in a communication session (e.g., a user is using IP phone 16A to make a voice call).

CRM interfaces 18 receive signal processing tasks from CRM 10 based on respective availability and capabilities of corresponding IP phones 16. For instance, CRM 10 may determine that IP phone 16A is capable of and available to transcode a bitstream encoded with ITU G.723.1 to a bitstream encoded with ITU G.711. CRM 10 sends the signal processing task, including the task parameters, and directs the bitstream to CRM interface 18A to cause IP phone 16A to process the bitstream in accordance with the task parameters.

Figure 3:
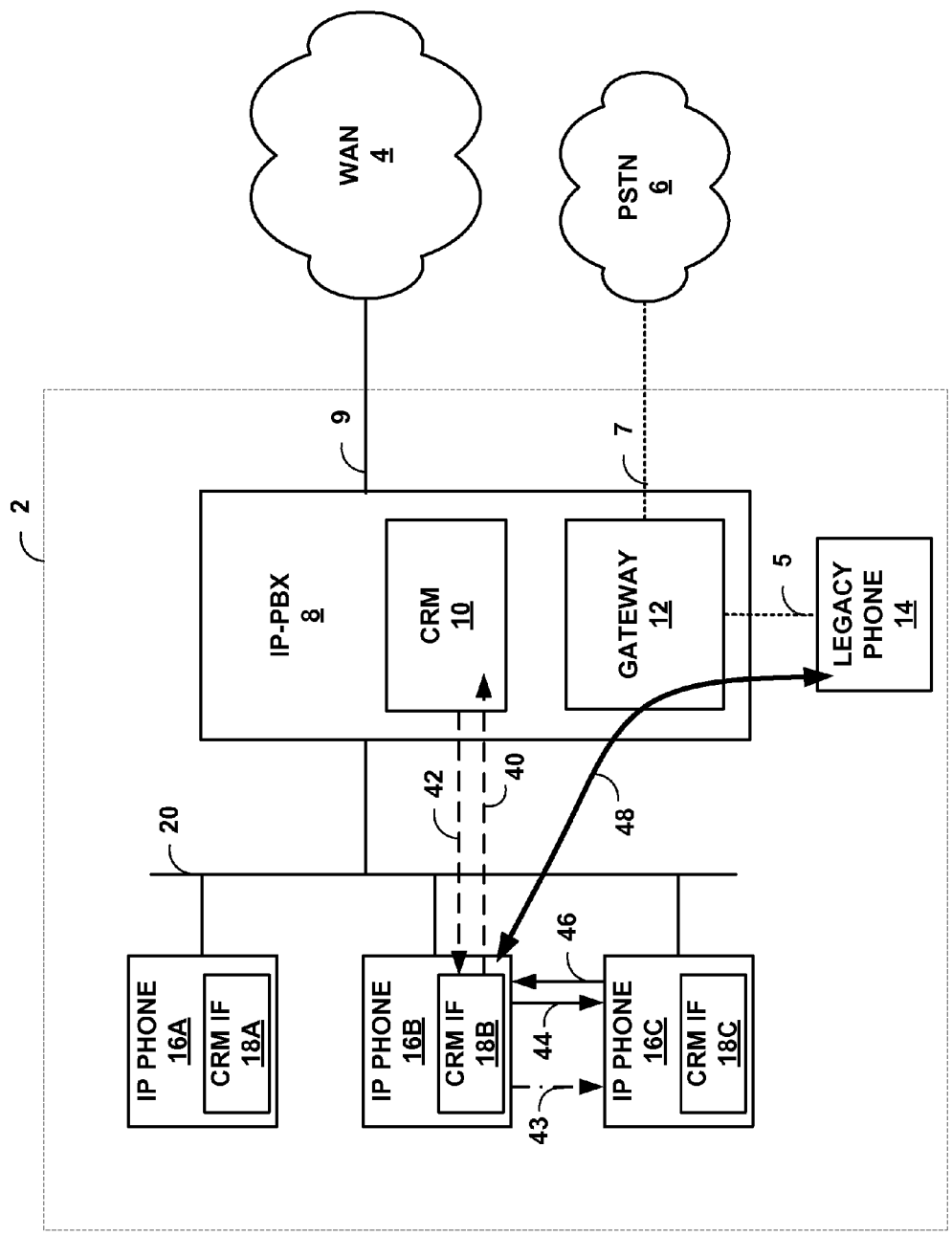
FIG. 3 is a block diagram that illustrates distribution, by an exemplary IP phone, of a signal processing task to another IP phone in accordance with the techniques of this disclosure.

In some embodiments, as described in detail with respect to FIG. 3, aspects of CRM 10 functionality is distributed to CRM interfaces 18 such that any of CRM interfaces 18 may also distribute a signal processing task to another one of CRM interface 18. For example, a communication session involving IP phone 16A may require teleconference mixing, a DSP capability that IP phone 16A, in this example, does not provide. However, CRM interface 18A may send a signal processing task to CRM interface 18B to direct IP phone 16B to perform the teleconference mixing on behalf of IP phone 16A. In some instances, CRM interfaces 18 may request CRM 10 to provide an identity of an IP phone 16 that is capable of and available to perform a signal processing task on behalf of the IP phone 16 corresponding to the requesting CRM interface.

By cooperating to enable to CRM 10 to distribute signal processing tasks to IP phones 16, the techniques described with respect to CRM 10 and CRM interfaces 18 may enable IP telephone system 2 to increase the utilization of existing DSP resources and thereby avoid, or reduce the amount of, dedicated DSP resources needed to support the service requirements of the system. In addition, adding additional ones of IP phones 16 automatically increases the amount of available DSP resources. The techniques may also allow IP phones 16 to distribute tasks among IP phones 16, which may have enable simpler IP phones to leverage the capabilities of high-performance IP phones.

Figure 2:
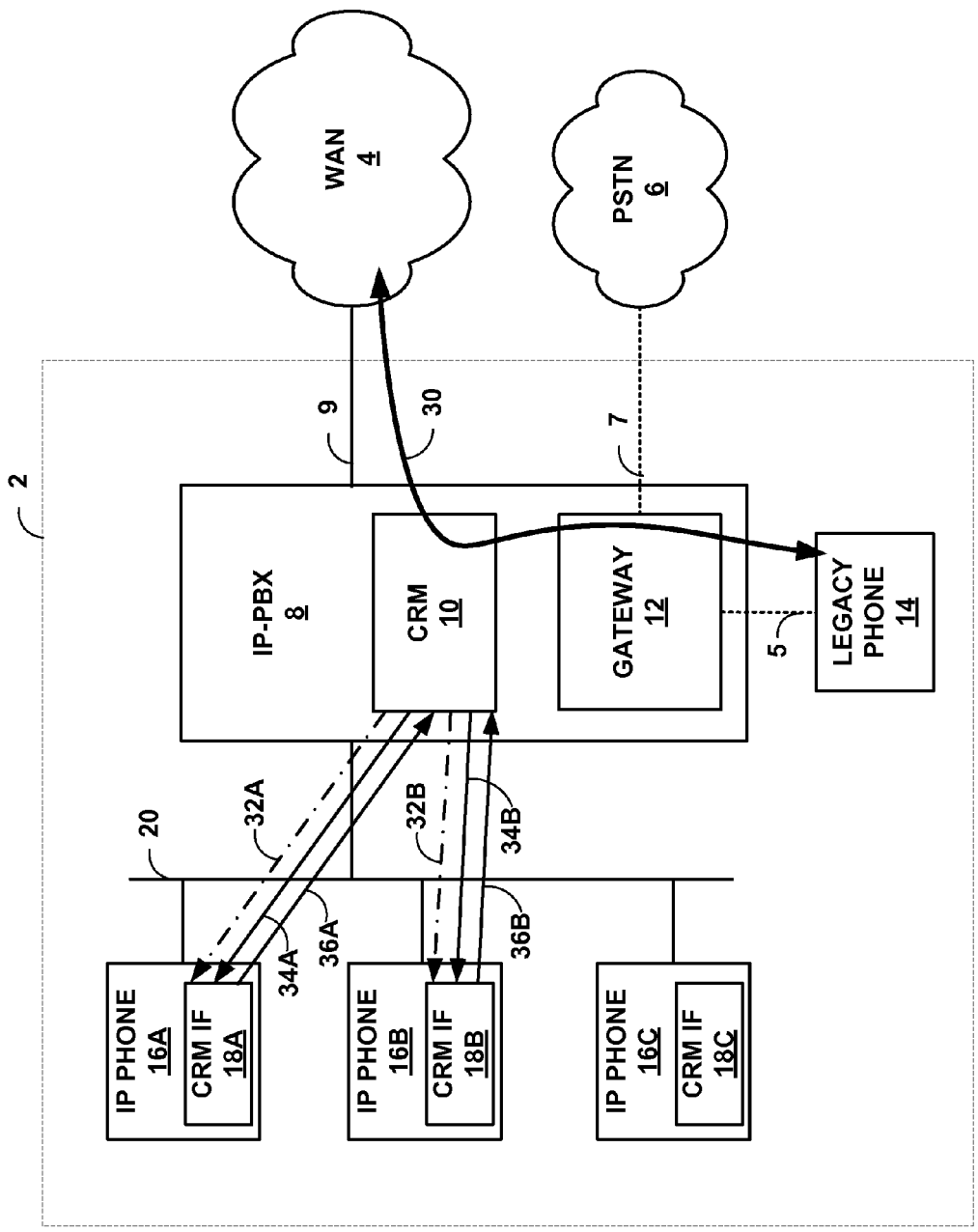
FIG. 2 is a block diagram that illustrates distribution, by the exemplary IP-PBX of FIG. 1, of signal processing tasks to exemplary IP phones in accordance with the techniques of this disclosure.

FIG. 2 is a block diagram that illustrates distribution, by exemplary IP-PBX 8 of FIG. 1, of signal processing tasks 32A-32B to respective IP phones 16A-16B in accordance with the techniques of this disclosure. In the illustrated example, legacy phone 14 of IP telephone system 2 participates in communication session 30 with another device connected to IP telephone system 2 via WAN 4. Communication session 30 may be, for instance, a voice call, a teleconference in which legacy phone 14 participates, or another type of communication.

IP-PBX 8 and WAN 4 exchange packetized communication data for communication session 30 as a packet-based bitstream (e.g., an RTP bitstream arriving as a series of one or more RTP packet payloads). Gateway 12 of IP-PBX 8 acts as a gateway between the packet-switched, IP domain within IP telephone system 12 and the TDM-based, circuit-switched domain that comprises legacy phone 14. That is, gateway 12 transcodes the downstream packet-based bitstream of communication session 30 received by IP-PBX 8 to a digital signal compatible with legacy phone 14. Gateway 12 receives upstream TDM-based digital signal data for communication session 30 from legacy phone 14 and transcodes the digital signal to a packet-based bitstream for transmission by IP-PBX 8 to a destination device via WAN 4. In some instances, gateway 12 may be tasked with tone detection, echo cancellation, voice compression/decompression, and other signal processing functions.

CRM 10 monitors availability and capabilities of DSP resources within IP telephone system 2, including DSP resources of IP phones 16 and of gateway 12. CRM interfaces 18 update CRM 10 with a DSP resource status of corresponding IP phones 16, and CRM 10 manages the updates to maintain a record of available DSP resources.

CRM 10 may determine gateway 12 does not have sufficient resources available to perform the requisite signal processing for communication session 30, or is otherwise not a preferred DSP resource for performing signal processing for communication session 30. For example, during a capability negotiation to set up communication session 30, CRM 10 may determine gateway 12 has reserved DSP resources in use such that gateway 12 DSP resources are unable to additionally transcode a bitstream of communication session 30 according to a particular negotiated codec.

Having determined gateway 12 is not a preferred DSP resource, CRM 10 selects primary and backup ones of IP phones 16 that each comprise a DSP resource sufficient to perform an aspect of the requisite signal processing for communication session 30. In the illustrated example, CRM 10 selects IP phone 16A as a primary DSP resource and selects IP phone 16B as a backup DSP resource for at least one signal processing task for which gateway 12 is responsible to further communication session 30. Upon selecting IP phones 16A and 16B as redundant DSP resources, CRM 10 sends, via LAN 20, signal processing task 34A to CRM interface 18A and sends signal processing task 34B to CRM interface 18B. Signal processing tasks 32A-32B are collectively referred to hereinafter as "signal processing tasks 32"). In the illustrated example, signal processing tasks 32 include signal processing parameters that direct respective IP phones 16 to transcode, on behalf of gateway 12, the downstream packet-based bitstream of communication session 30 received by IP-PBX 8 to a digital signal compatible with legacy phone 14.

In addition to sending signal processing tasks 32, CRM 10 operates as a destination proxy for legacy phone 14 for communication session 30. That is, CRM 10 intermediates the downstream packet-based bitstream of communication session 30 as it traverses IP telephone system 2 to legacy phone 14. CRM 10 replicates and directs, via LAN 20, the replicated, unprocessed bitstreams 34A and 34B ("unprocessed bitstreams 34") to respective CRM interfaces 18A and 18B for simultaneous, redundant distributed processing. IP phones 16A and 16B then process the unprocessed bitstreams 34 in accordance with signal processing tasks 34 and return respective processed bitstreams 36A and 36B to CRM 10. For example, CRM interface 18A receives unprocessed bitstream 34A from CRM 10 and provides the unprocessed bitstream to the DSP resource of IP phone 16A, which processes and returns the bitstream via CRM interface 18A to CRM 10 as processed bitstream 36B. In the exemplary embodiment, processed bitstreams 36 comprise communication session 30 data encoded as TDM-based data signals compatible with legacy phone 14. In some examples, processed bitstreams 36 comprise communication session 30 data encoded as RTP streams, a collection of one or more RTP packets, or some other data format.

CRM 10 selects processed bitstream 36A received from IP phone 16A (the primary DSP resource in this example) and forwards processed bitstream 36A to gateway 12 for transmission to legacy phone 14 via link 5 to further communication session 30. In this manner, CRM 10 and CRM interfaces 18A and 18B cooperate to enable IP-PBX 8 to distribute aspects of signal processing for communication session 30 to DSP resources located on IP phones 16A and 16B.

FIG. 3 is a block diagram that illustrates distribution, by exemplary IP phone 16B of FIG. 1, of a signal processing task 43 to IP phone 16C in accordance with the techniques of this disclosure. In the illustrated example, IP phone 16B and legacy phone 14 of IP telephone system 2 participate in communication session 48. Communication session 48 may be, for instance, a voice call, a teleconference, or another type of communication.

In this embodiment, in accordance with the techniques of this disclosure, CRM interfaces 18 distribute signal processing tasks among idle ones of IP phones 16 to perform distributed signal processing using idle DSP resources located within IP phones 16.

CRM interfaces 18 may request CRM 10 to provide an identity of one of IP phones 16 that is capable of and available to perform a signal processing task on behalf of the IP phone 16 corresponding to the requesting CRM interface. In the illustrated example, CRM interface 18B sends resource request message 40 to CRM 10, which responds with an identity of IP phone 16C in resource response message 42. Resource request message 40 may include task parameters to characterize the signal processing task that IP phone 16B is to have performed. Resource response message 42 may include a network address of IP phone 16C.

Upon receiving the identity of IP phone 16C from CRM 10, CRM interface 18B sends CRM interface 18C signal processing task 43 and unprocessed bitstream 44. In the illustrated example, signal processing tasks 43 includes signal processing parameters that direct IP phone 16C to process, on behalf of IP phone 16B, an unprocessed bitstream of communication session 48 between IP phone 16B and legacy phone 14. Unprocessed bitstream 44 may be downstream or upstream with respect to IP phone 16B. Signal processing task 43 may comprise echo cancellation, transcoding, a codec function, or some other DSP function. In some instances, CRM interface 18B replicates unprocessed bitstream 44 to send a replicated bitstream to IP phone 16A for redundant processing.

CRM interface 18C receives signal processing task 43 and directs IP phone 16C to process bitstream 44 in accordance with the task to generate processed bitstream 46. CRM interface 18C returns processed bitstream 46 to IP phone 16B via CRM interface 18B.

In some embodiments, aspects of CRM 10 are distributed to CRM interfaces 18 to reduce reliance of CRM interfaces 18 on CRM 10 and thereby reduce the processing burden on IP-PBX 8. For example, CRM interfaces 18 may maintain a database of available DSP resources on IP phones 16 and, when necessary, send signal processing tasks to any of the available, capable DSP resources for the tasks. In another example, one of CRM interfaces 18 may send resource request messages to other CRM interfaces 18, rather than to CRM 10, to determine availability the corresponding IP phones 16.

Figure 4:
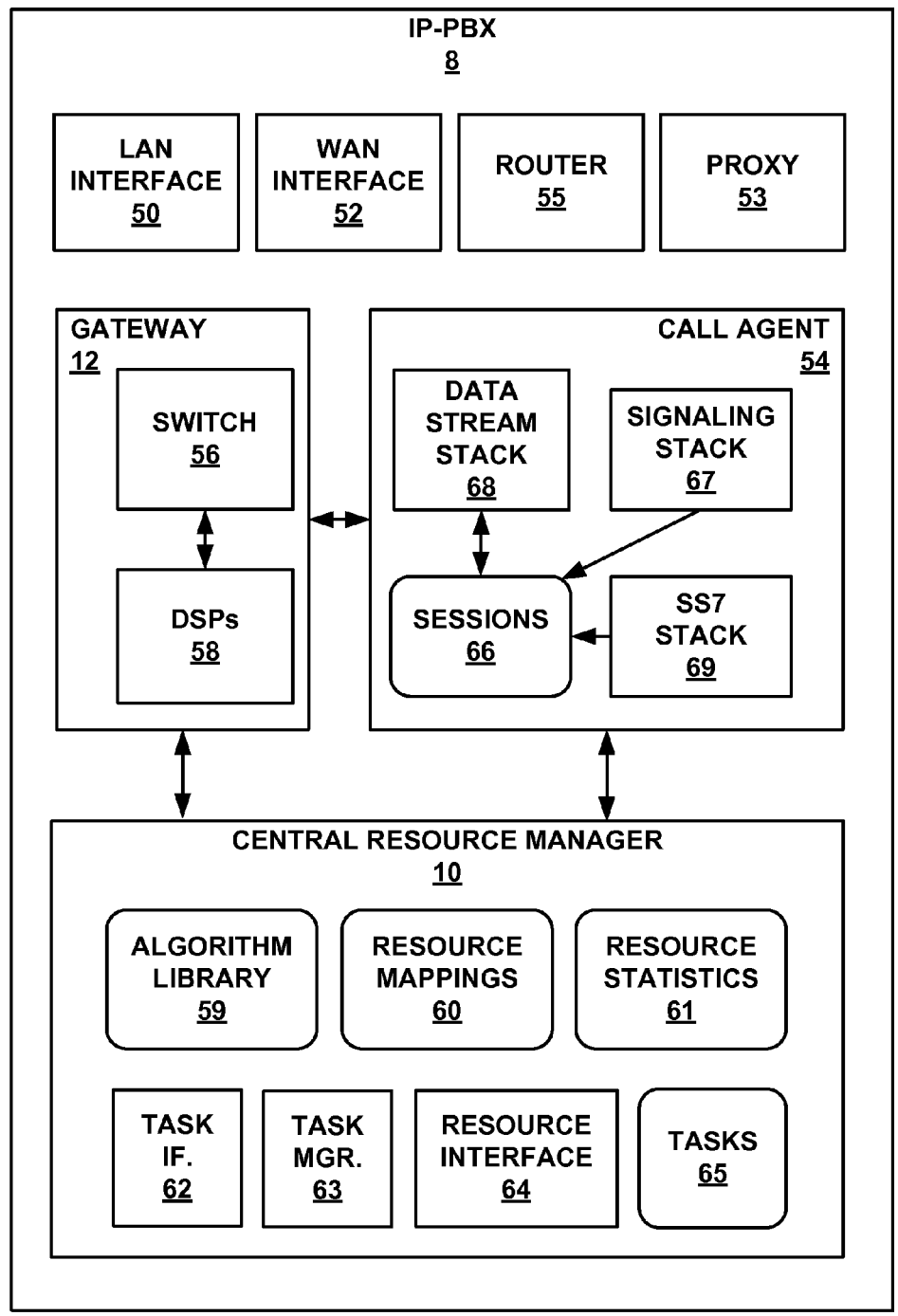
FIG. 4 is a block diagram illustrating the exemplary IP-PBX of FIG. 1 in further detail.

FIG. 4 is a block diagram illustrating exemplary IP-PBX 8 of FIG. 1 in further detail. LAN interface 50 of IP-PBX 8 exchanges data and control packets with CRM interfaces 18 over LAN 20. WAN interface 52 exchanges data and control packets over network link 9 with network devices connected to WAN 4. LAN interface 50 and WAN interface 52 may comprise one or more Ethernet interfaces, WAN interfaces, other network interfaces.

Router 55 performs network routing functions for IP-PBX 8, including executing routing protocols, maintaining a routing table of route data learned from the routing protocols, and forwarding traffic along network paths using forwarding information derived from the route data. Router 55 exchanges packets with other network devices via LAN interface 50 and WAN interface 52.

Proxy 53 represents IP-PBX 8 to other communication devices as one or more other elements of IP telephone system 2. For example, proxy 53 may advertise, to WAN 4 via network link 9, a network address of IP-PBX 8 as a destination address for one or more IP phones 16 or gateway 12 (i.e., the gateway to legacy phone 14 of IP telephone system 2 of FIG. 1). As another example, proxy 53 may send a SIP REGISTER request to a SIP registrar that registers a network address of IP-PBX 8 to a SIP Uniform Resource Identifier (URI) for one of IP phones 16. Proxy 53 performs network address translation (NAT) to map a bitstream to an intended communication device and enable router 55 to forward the bitstream to the intended destination. In this way, communication session bitstreams intended for IP phones 16 can be received by IP-PBX 8 for processing and eventual forwarding to an intended destination IP phone via LAN interface 50.

IP-PBX 8 comprises call agent 54 to manage signaling control for creating, maintaining, and tearing down communication sessions 66 that IP-PBX 8 intermediates on behalf of legacy elements, such as legacy phone 14 or PSTN 6 of FIG. 1. Call agent 54 includes a signaling stack 67 that comprises a protocol stack for one or more call signaling protocols, such as SIP, H.323, Media Gateway Control Protocol (MGCP), and H.248. To establish a new communication session, call agent 54 executes protocols in signaling stack 67 to exchange control information with other signaling devices, such as media gateway controllers, signaling controllers, other IP-PBXs, or IP phones 16. Call agent 54 directs data stream stack 68 to create and tear down communication sessions when the calls are generated or terminated. For example, call agent 54 may direct data stream stack 68 to establish an RTP session with another network device.

Call agent 54 additionally includes signaling system #7 ("SS7") stack 69 to exchange control information with legacy devices and/or remote, traditional exchanges to create and tear down, in conjunction with switch 56, TDM channels or other circuit-switched connections between gateway 12 and legacy devices. Switch 56 couples to digital and/or analog circuits, such as trunk 7 and analog line 5, via circuit interfaces and switches circuit-based connections for communication sessions using an internal switching network, such as a cross-bar switch, according to corresponding record parameters in communication sessions 66.

Data stream stack 68 comprises a protocol stack for one or more communication protocols. In the illustrated embodiment, data stream stack 68 comprises RTP operating over UDP/IP. Data stream stack 68 may further comprise Real-time Transfer Control Protocol (RTCP) or RTP operating over TCP/IP. Call agent 54 executes protocols in data stream stack 68 to establish a communication session, for instance an RTP session, with another network device.

Call agent 54 stitches together circuit-switched connections created using SS7 stack 69 and packet-switched connections created using signaling stack 67 to create an end-to-end communication session to deliver voice and other data between communication devices. For each such communication session, call agent 54 maintains a record in communication sessions 66 ("sessions 66"), which stores one or more records that comprise parameters and state data for a corresponding one or more communication sessions for which gateway 12 is an intermediary. Communication session parameters may, for example, identify endpoints (using, e.g, a network address or SIP-URI), identify an RTP stream, and specify switch 56 circuit interfaces. In this way, sessions 66 map circuit-switched connections coupled to switch 56 of gateway 12 with packet-switched connections, such as RTP sessions for RTP streams received by LAN interface 50 or WAN interface 52. Records in sessions 66 may additionally specify and describe, for a communication session, digital signal processing requirements for the session, including echo cancellation, teleconference mixing, and/or transcoding, for instance. For example, a session 66 record may specify transcoding an incoming RTP stream from an ITU G.723.1 6.3 kbit/s encoding to an ITU G.711 64 kbit/s encoding and forwarding the processed RTP stream to IP phone 16B.

Gateway 12 additionally includes dedicated digital signal processors (DSPs) 58 to transcode TDM channel bitstreams and RTP streams for a communication session to interface the circuit-switched and packet-switched connections that terminate at the gateway. DSPs 58 may additionally perform other digital signal processing functions required for the session, as specified by a corresponding record in sessions 66. DSPs 58 comprise one or more digital signal processors, application-specific integrated circuits (ASICs) or other logic circuits, general- or special-purpose processors, or other logic circuits, to execute digital signal processing routines stored in firmware or other tangible, computer-readable media. DSPs 58 may operate as co-processors for a central processing unit (CPU) that provides an operating environment for elements of gateway 12. DSPs 58 are referred to herein as static DSP resources and may be prioritized by IP-PBX 8 components for performing signal processing functions over non-local DSP resources.

IP-PBX 8 comprises central resource manager 10 ("CRM 10"), illustrated in FIG. 4 in further detail, to monitor and manage the availability and capabilities of re-targetable digital signal processing (DSP) resources within IP phones and static DSP resources within gateway 12, and to coordinate distribution of signal processing tasks and corresponding bitstreams to available, capable DSP resources.

CRM 10 comprises resource interface 64 to interface with gateway 12 and to exchange messages, via LAN interface 50, with CRM interfaces 18 to determine capabilities and availability of various re-targetable and static DSP resources within the IP telephone system, including DSPs 58 of gateway 12 and DSPs or other processing resources of each of IP phones 16. A re-targetable resource, as the phrase is used herein, is a device or device component, other than DSPs 58, that is capable of executing signal processing tasks delegated to the resource by a resource manager, such as CRM 10. For instance, a re-targetable resource may refer to one of IP phones 16, to a particular digital signal processor or other logic that constitutes an IP phone, to a particular pipeline or sub-component (e.g., an arithmetic logic unit or floating-point unit) of a DSP or other processor of the IP phone, or some other resource. An IP telephone DSP resource is a re-targetable resource of an IP telephone. Resource interface 64 may query gateway 12 to obtain descriptions of signal processing capabilities provided by the resources, as well as descriptions of resources' availability. In some instances, gateway 12 and/or CRM interfaces 18 provide resource updates to CRM 10 via resource interface 64 whenever capabilities or availability of the respective resource changes. For example, call agent 54 may, upon routing a call involving IP phone 16C, send a resource update that indicates an unavailability of IP phone 16C to CRM 10.

Signal processing capability descriptions may include, for instance, a list of codecs executable by a resource, one or more signal processing routines (e.g., echo cancellation) executable by a resource, a description of performance capabilities (e.g., processing rate, latency, and number of 1-kilobyte fast-fourier transforms calculable per minute) provided by a resource, a total number of execution threads sustainable by a resource, and other information that may be used by CRM 10 to determine an appropriate resource to target with a signal processing task. Resource availability descriptions may include historical usage data, current usage data, anticipated usage data, or other information that may be used by CRM 10 to effectively coordinate delegation of a signal processing task to a re-targetable resource.

Resource interface 64 maps re-targetable resources to signal processing capabilities in resource mappings 60, an associative data structure that keys an identifier for a signal processing capability, such as a codec, to a list of identifiers for resources that are qualified to perform the capability. For example, resource mappings 60 may include a record that lists IP phone 16A as a re-targetable resource capable of transcoding an ITU G.723.1 6.3 kbit/s encoding of the bitstream to an ITU G.711 64 kbit/s encoding for the bitstream. In some embodiments resource mappings 60 includes records that specify a characteristic performance measure for the associated DSP resource with respect to the signal processing routine mapped by the record.

Resource interface 64 receives updated resource availability descriptions from DSPs 58 and CRM interfaces 18 and stores the descriptions in resource availability records in resource statistics 61 of CRM 10. Resource statistics 61 is a data structure that stores one or more resource availability descriptions for the re-targetable and static resources of IP telephone system 2. Each resource availability description comprises, for example, an identifier for a resource, such as a network address or a DSP 58 identifier, a flag that indicates whether a resource is currently available, a list of previous dates and times in which the resource was unavailable to perform signal processing tasks, as well as other information that may enable CRM 10 to predict a future availability of re-targetable resources to perform signal processing tasks.

CRM 10 additionally comprises task manager 63 (illustrated as "task mgr. 63"), task interface 62 ("illustrated as task if 62"), and tasks 65 to manage distribution of signal processing tasks to the re-targetable resources within IP telephone system 2. Task manager 63 determines, from sessions 66, signal processing requirements for the communication sessions involving gateway 12 and/or IP phones 16. In some embodiments, call agent 54 triggers task manager 63 with a message requesting performance of a signal processing task with respect to a particular session. When task manager 63 finds a new or otherwise not delegated signal processing requirement in one of sessions 66, task manager 63 obtains the requirement description (e.g., codec identifiers, type of processing requirements) and creates a new signal processing task and stores the new task as a record in tasks 65 of CRM 10. Signal processing task records in tasks 65 specify task parameters as well as whether a task is delegated and, if so, an identifier for the delegate (e.g., IP phone 16B or DSPs 58).

Task interface 62 exchanges signal processing task-related information with re-targetable resources. For example, task interface 62 may receive a task update from CRM interface 18B of IP phone 16B indicating that a task is complete. As another example, task interface 62 may send a signal processing task to a re-targetable resource directing the resource to perform the task. Task interface 62 and resource interface 64 may be standardized to enable multiple vendors to provide compatible algorithms and bitstream handling by CRM 10.

Task manager 63 queries resource mappings 60 and resource statistics 61 to identify one or more available, capable DSP resources with which to delegate a signal processing task. Upon identifying such resources, task manager 63 selects one of the resources and delegates the signal processing task to the selected resource. Task manager 63 stores a delegated resource identity in the corresponding record for the signal processing task in tasks 65 and sends the signal processing task, via task interface 62, to the delegated resource for the task. Task manager 63 updates resource statistics 61 to indicate that the delegated resource is currently in use. In some aspects, task manager 63 selects and delegates to multiple DSP resources to provide redundant processing via primary and backup DSP resources. In this way, task manager 63 may provide graceful failover if the primary DSP resource fails in some way to perform a delegated signal processing task.

In some embodiments, task manager 63 prioritizes static resources, such as DSPs 58, for delegation over re-targetable resources, such as IP phones 16. An administrator or software agent may set a low-watermark setting for DSPs 58 such that when utilization of DSPs 58 exceeds the low-watermark, task manager 63 delegates signal processing tasks to re-targetable resources rather than to the static resources. For example, an administrator may set a low-watermark at 80% utilization. Task manager 63 monitors DSPs 58 utilization and delegates tasks when utilization exceeds 80%.

In some embodiments, task manager 63 queries and analyzes statistical usage data in resource statistics 61 for re-targetable resources to predict impending availabilities of the resources. For example, task manager 63 may determine IP phone 16C frequently participates in voice calls during weekday afternoons and may thus determine that, even if IP phone 16C is immediately available during a weekday afternoon, the phone nevertheless should be given a low priority for receiving signal processing tasks during those times due to a relatively high probability that the tasks may be interrupted by a voice call. In such embodiments, task manager 63 may reduce the probability that a signal processing task will be interrupted by an incoming/outgoing call in which a delegated one of IP phones 16 participates. In conjunction with employing redundant bitstream processing by multiple IP phones 16, these techniques may reduce the probability that a transcoding operation will be interrupted during a communication session.

In addition to delegating signal processing tasks, task manager 63 re-directs corresponding bitstreams for the tasks to the delegated resource. If a bitstream is proxied by proxy 53, task manager 63 may direct proxy 53 to forward the bitstream to the delegated resource via LAN interface 50. In some embodiments, task manager 63 directs router 55 to install forwarding information to enable proxy 53 to properly forward the bitstream. If a bitstream is intermediated by gateway 12 in a communication session that involves legacy devices, task manager 63 may direct call agent 54 to forward the bitstream to the delegated resource via LAN interface 50. In some embodiments, task manager 63 modifies a corresponding record in sessions 66 to stitch the bitstream to a path via LAN interface 50 to the delegated resource.

In some embodiments, task manager 63 receives resource requests from one of CRM interface 18 requesting an identity of another one of IP phones 16 that is capable of and available to perform a signal processing task on behalf of the requesting CRM interface. In such embodiments, task manager 63 resource mappings 60 and resource statistics 61 to identify such a resource return the identity of the resource to the requesting CRM interface.

CRM 10 additionally maintains algorithm library 59, a store of one or more signal processing routines that CRM 10 may upload to re-targetable resources to upgrade the resources for delegated signal processing tasks. Algorithm library 59 may store, for instance, particular codecs, echo cancellation routines, teleconference mixing algorithms, and/or other signal processing routines that can be performed by re-targetable resources, such as IP phones 16, in firmware or other computer-readable storage media, including tangible computer-readable storage media. In some instances, DSPs 58 may store one or more algorithms of algorithm library 59. Task manager 63 directs resource interface 64 to upload signal processing routines, such as codecs, to re-targetable resources to augment capabilities of the re-targetable resources. For example, task manager 63 may direct resource interface 64 to upload an ITU G.711 codec to IP phone 16B to enable the IP phone to transcode a communication bitstream encoded according to the ITU G.711 standard.

Delegated DSP resources for signal processing tasks, such as one or more of IP phones 16, return bitstreams processed in accordance with delegated signal processing tasks, to IP-PBX 8 for forwarding to destination endpoints for the corresponding communication sessions. Task manager 63 re-directs processed bitstreams to the appropriate destination endpoints via LAN interface 50, WAN interface 52, or switch 56. In this manner, CRM 10 distributes signal processing tasks and corresponding unprocessed bitstreams to re-targetable DSP resources and receives, in return, processed bitstreams that static DSPs 58 would otherwise generate for IP-PBX 8. As a result, the techniques of this disclosure may reduce processing requirements of dedicated, static DSPs 58 by leveraging existing idle DSP resources distributed within IP telephone system 2.

Figure 5:
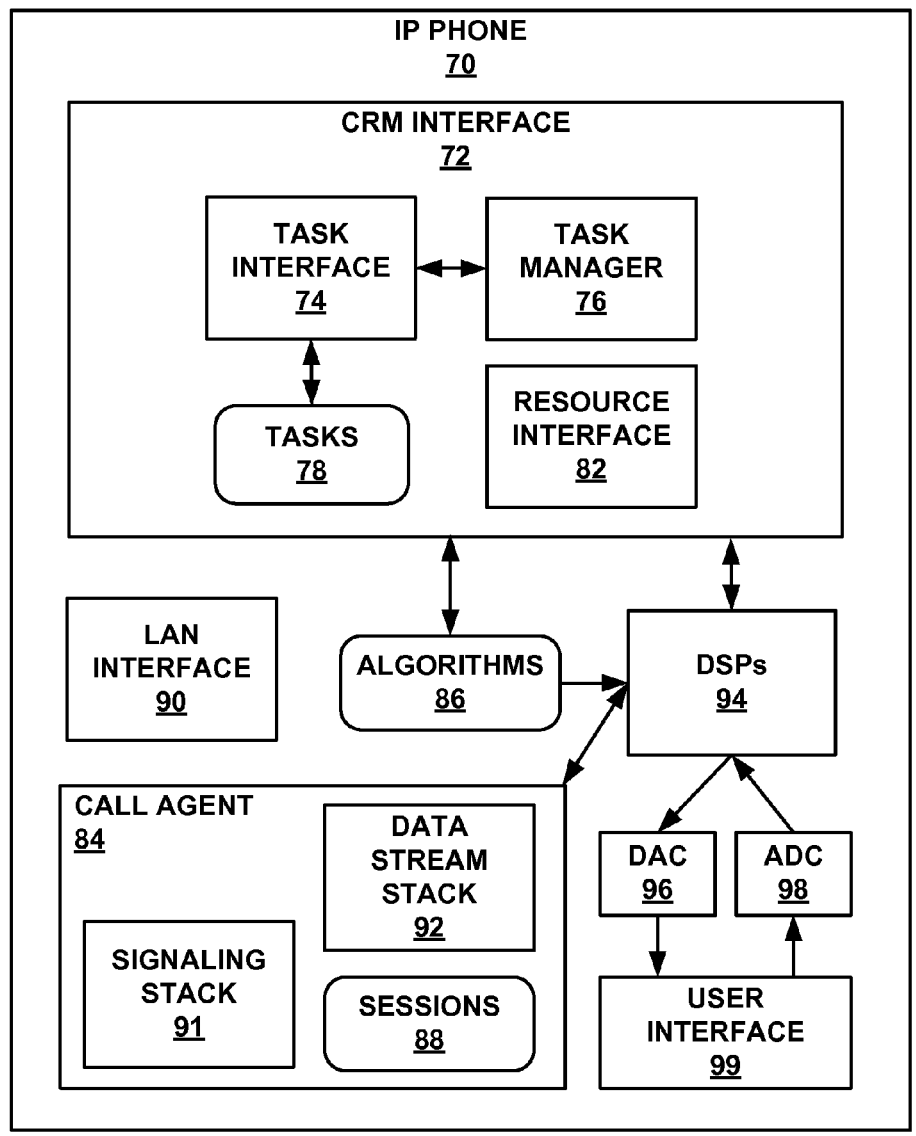
FIG. 5 is a block diagram illustrating, in detail, an IP phone that receives and processes delegated signal processing tasks according to the techniques of this disclosure.

FIG. 5 is a block diagram illustrating, in detail, an IP phone 70 that includes CRM interface 72 to perform techniques that accord with this disclosure. IP phone 70 and CRM interface 72 may be substantially similar to any of IP phones 16 and CRM interfaces 18, respectfully, of FIG. 1. CRM interface 72 may comprise an application programming interface (API). In some embodiments, CRM interface 72 exposes one or more Remote Procedure Calls (RPCs) implemented as, for instance, Simple Object Access Protocol (SOAP) procedures. In such embodiments, other devices, such as IP-PBX 8 invoke SOAP procedures of CRM interface 72 by exchange eXtensible Markup Language (XML) formatted message exchanged using an application-layer (Open Systems Interconnection model layer 7) protocol.

An exemplary request to an exposed SOAP procedure is reproduced below:

```
POST /InStock HTTP/1.1
Host: www.example.org
Content-Type: application/soap+xml; charset=utf-8
Content-Length: nnn
<?xml version="1.0"?>
<soap:Envelope
xmlns:soap="http://www.w3.o rg/2001/12/soap-envelope"
soap:encodingStyle="http://www.w3.org/2001/12/soap-encoding">
  <soap:Body xmlns:m="http://192.50.50.1"> // address of phone
      <m:GetRTCloudCaps>
          <m:TerminalType>IPPhoneBrandX</m:TerminalType>
      </m:GetRTCloudCaps>
  </soap:Body>
</soap:Envelope>
```

In this example, the request may cause CRM interface 72 to invoke the GetRTCloudCaps method using the TerminalType parameter to return signal processing capabilities of IP phone 70 to the request device.

User interface 99 of IP phone 70 may comprise one or more of a telephone headset or handset, a microphone, a speaker, or other devices with which a user interacts with IP phone 70 to send and receive communication data. User interface 99 digitizes received voice or other analog signals from a user using analog-to-digital converter 98 ("ADC 98"), which then directs the digitized user data to DSPs 94 for processing. In the other direction, user interface 99 receives analog signals converted from digital bitstreams by digital-to-analog converter 96 ("DAC 96") for output to a user.

DSPs 94 comprise one or more signal processing resources provided by one or more digital signal processors, ASICs or other logic circuits, general- or special-purpose processors, or other logic circuits. DSPs 94 execute digital signal processing routines stored by algorithms 86 in firmware or other computer-readable storage media, including tangible computer-readable storage media, and in some aspects may operate as co-processors for a central processing unit (CPU) that provides an operating environment for elements of IP phone 70. In some instances, one or more of algorithms 86 may be stored by DSPs 94. In accordance with the techniques of this disclosure, DSPs 94 may be targeted to performing distributed signal processing tasks on behalf of another device (e.g., IP-PBX 8) and is therefore referred to herein as a re-targetable resource. Algorithms 86 may comprise, for instance, particular codecs, echo cancellation routines, teleconference mixing algorithms, and/or other signal processing routines.

Call agent 84 of IP phone 70 manages signaling control for creating, maintaining, and tearing down communication sessions 88 in which IP phone 70 participates. Call agent 84 includes signaling stack 91 that comprises a protocol stack for one or more call signaling protocols, such as SIP, H.323, Media Gateway Control Protocol (MGCP), and H.248. To establish a new communication session, call agent 84 executes protocols in signaling stack 91 to exchange control information with other signaling devices, such as media gateway controllers, signaling controllers, an IP-PBX, or other IP phones. Call agent 84 directs data stream stack 92 to create and tear down communication sessions when the calls are generated or terminated. For example, call agent 84 may direct data stream stack 92 to establish an RTP session with another network device.

Data stream stack 92 comprises a protocol stack for one or more communication protocols. In the illustrated embodiment, data stream stack 92 comprises RTP operating over UDP/IP. Data stream stack 92 may further comprise Real-time Transfer Control Protocol (RTCP) or RTP operating over TCP/IP. Call agent 84 executes protocols in data stream stack 92 to establish a communication session, for instance an RTP session, with another network device.

IP phone 70 exchanges network packets with other network devices via LAN interface 90. In one example, LAN interface 90 receives an RTP stream associated with an RTP session. Data stream stack 92 decapsulates the application-layer communication session data from the RTP packets and delivers the data to DSPs 94 for processing. DSPs 94 may apply transcoding functions, echo cancellation functions, or other signal processing functions to the communication session data to enable or enhance user communications.

In accordance with the described techniques, CRM interface 72 receives signal processing tasks for execution by DSPs 94 to process a received bitstream. CRM interface 72 comprises resource interface 82 to communicate signal processing capabilities and availability of IP phone 70 to a central resource manager, such as central resource manager 10 of IP-PBX 8. For instance, resource interface 82 publicizes descriptions of signal processing routines stored by algorithms 86 to the central resource manager. In addition, resource interface 82 may collect statistical data regarding IP phone 70 usage and publicize the data to the central resource manager. Resource interface 82 also sends availability update messages to the central resource manager that comprise an indication of whether DSPs 94 are available for use as a re-targetable resource. For example, when resource interface 82 signaling stack 91 is establishing a voice call for a user, resource interface 82 may send an availability update message indicating a non-availability of DSPs 94.

A subset of exemplary procedures provided by resource interface 82 is reproduced below:

```
struct RT_CLOUD_CAPS {
    SDP_codec_list codec_list; // SIP / SDP standard codec list
    long proc_power; // estimate of processing power of codec in
multiples of a G.729AB instance
}
struct RT_CLOUD_STATS {
    long seconds_since_last_phone_call;
    long seconds_since_last_transcode;
    long number_of_phone_calls_during_last_24_hours;
}
// returns a structure of type RT_CLOUD_CAPS
RT_CLOUD_CAPS query_RT_cloud_caps ( void );
// returns a structure of type RT_CLOUD_STATS
RT_CLOUD_STATS query_RT_cloud_stats ( void );
```

In the example procedures above, query_RT_cloud_stats returns a structure that embodies statistical data regarding IP phone 70 usage to a requesting device. As another example, query_RT_cloud_caps returns a structure that embodies a list of capabilities, in the form of available codecs and a processing power of DSPs 94.

CRM interface 72 also comprises task interface 74 to receive signal processing tasks and exchange task-related data with a central resource manager. Task interface 74 stores received task parameters in a corresponding record in tasks 78, a set of one or more signal processing task records for execution by DSPs 94. Task parameters for a signal processing task received by task interface 74 and stored in tasks 78 identify a corresponding bitstream received by LAN interface 50 for the signal processing task. Task manager 76 applies the signal processing task to process the bitstream by allocating one or more constituent DSP resources of DSPs 94 to the signal processing task such that the allocated resources perform the signal processing function specified by the task parameters. Task manager 76 then returns the processed bitstream to the central resource manager or a bitstream destination device via LAN interface 90. In some aspects, task manager 76 may modify sessions 88 to direct the processed bitstream to a destination. Task interface 74 and resource interface 82 may be standardized to enable multiple vendors to provide compatible algorithms and bitstream handling by CRM interface 72. In some aspects, a received bitstream is processed by DSPs 94 and returned via LAN interface 90 as a stream. That is, DSPs 94 continually process the bitstream as the bitstream data is received and task manager 76 returns any processed bitstream data as it is processed.

A subset of exemplary procedures provided by task interface 74 is reproduced below:

```
// returns a boolean success flag
BOOLEAN set_codec_params (CODEC_TYPE codec_t,
PARAMS codec_p);
```

-continued

```
// returns a TRANSCODE_STATUS structure which would contain
element
TRANSCODE_STATUS request_RT_cloud_transcode_channel
(CODEC_TYPE
    ingress_codec_t, CODEC_TYPE egress_codec_t,
    destination_address);
struct TRANSCODE_STATUS {
    long ingress_packet_count;
    long egress_packet_count;
    long concealed_packet_count;   // how many packets had to be
interpolated due to network loss, etc
}
```

For example, set_codec_params sets the parameters of a codec in algorithms 86. As another example, request_RT_cloud_transcode_channel requests a digital signal processing channels of DSPs 94 to process a particular bitstream using an ingress and egress codec.

In some embodiments, CRM interface 72 interacts with signaling stack 91 to offload signal processing tasks for a communication session, in which IP phone 70 participates, to another device having improved signal processing capabilities. For example, signaling stack 91 may establish a communication session that requires IP phone 70 to transcode a bitstream using a codec that algorithms 86 does not store or that DSPs 94 are unable to perform within specified requirements. As a result, CRM interface 72 may send a resource request to a central resource manager to request an identity of an available, capable re-targetable resource. Upon receiving an identity for such a resource, CRM interface 72 directs one or more corresponding bitstreams for the communication session to the re-targetable resource and receives, in response, the processed bitstreams. CRM interface 72 may send a processed, downstream bitstream to data stream stack 92 or DSPs 94 for further processing or output via user interface 99.

Figure 6:
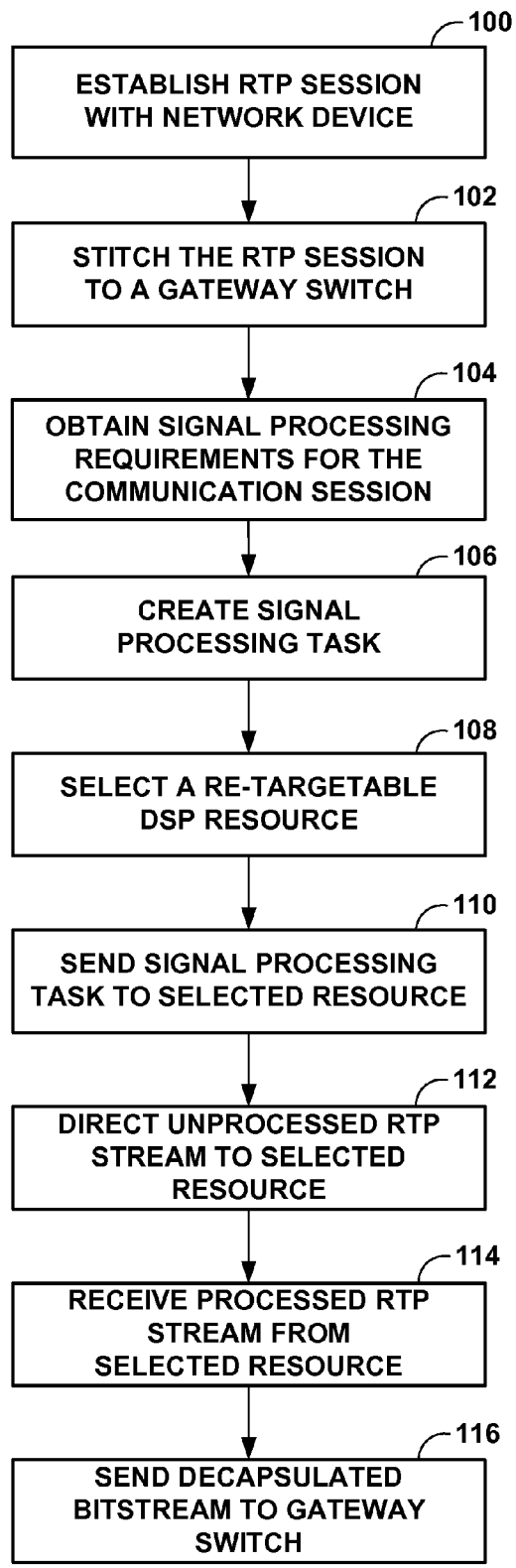
FIG. 6 is a flowchart illustrating an exemplary operation of the exemplary IP-PBX of FIG. 4 for distributing digital signal processing tasks in accordance with the described techniques.

FIG. 6 is a flowchart illustrating an exemplary operation of the exemplary IP-PBX 8 of FIG. 4 for distributing digital signal processing tasks in accordance with the described techniques. Initially, signaling stack 67 of call agent 54 receives a request for a call to a legacy phone, creates a packet-switched portion of a communication session for the call with a network device using SIP, for example, and directs data stream stack 68 to establish an RTP session with the network device (100). Because IP-PBX 8 operates as TDM gateway for the legacy phone, call agent 54 additionally stitches the established RTP session to switch 56 to create an end-to-end communication session (102).

Task manager 63 of central resource manager 10 obtains signal processing requirements for the communication session, negotiated by signaling stack 67 during the setup phase, from sessions 66 (104). Task manager 63 creates a signal processing task having task parameters that specify the requirements (106). Task manager 63 then queries resource mappings 60 and resource statistics 61 to identify and select a capable, available re-targetable resource to perform the signal processing task (108).

Task interface 62 sends the signal processing task to the selected delegate resource (110), and task manager 63 directs proxy 53 to forward, via LAN interface 50, the downstream unprocessed RTP stream associated with the communication session to the selected resource (112). LAN interface 50 receives the processed RTP stream (114), which data stream stack 68 decapsulates, if necessary, and then task manager 63 directs the resulting digital bitstream to switch 56 for transmission to the legacy phone (116).

Figure 7:
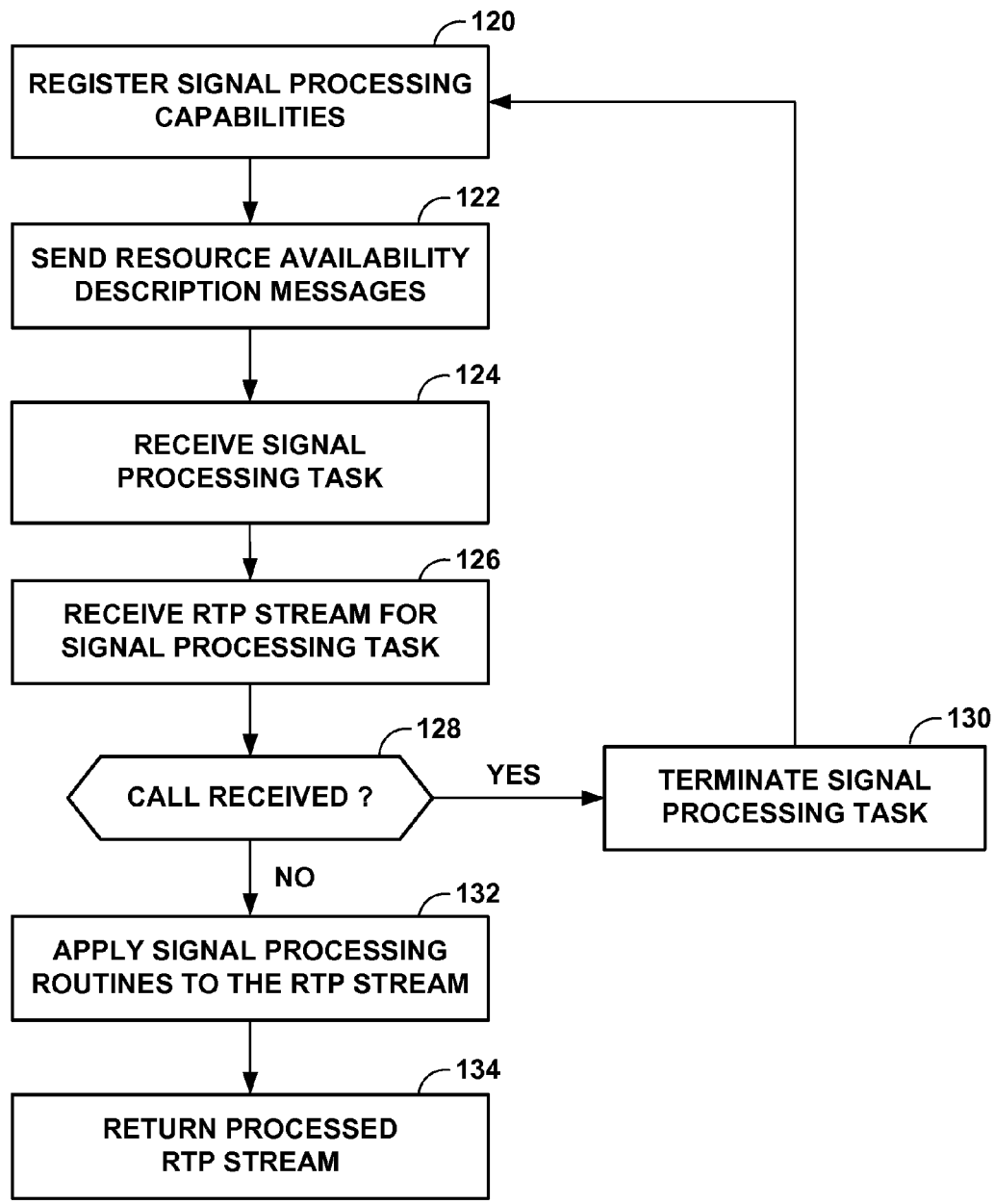
FIG. 7 is a flowchart illustrating an exemplary operation of the exemplary IP phone of FIG. 5 to receive and perform a delegated signal processing task according to the techniques of this disclosure.
Figure 8:
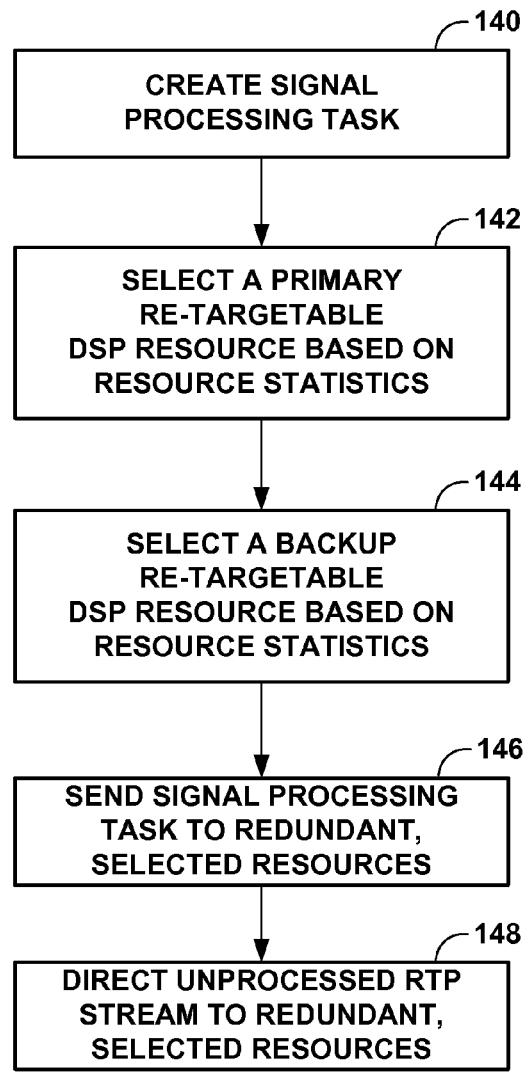
FIG. 8 is a flowchart illustrating an exemplary operation of exemplary IP-PBX of FIG. 4 for selecting multiple, redundant re-targetable DSP resources to process a bitstream of a communication session in accordance with the described techniques.

FIG. 7 is a flowchart illustrating an exemplary operation of the exemplary IP phone 70 of FIG. 5 to receive and perform a delegated signal processing task according to the techniques of this disclosure. Initially, resource interface 82 registers signal processing capabilities of IP phone 70 (120). To register, resource interface 82 may send messages to a central resource manager the comprise descriptions or identifiers of various signal processing routines stored in algorithms 86, as well as various performance metrics for DSPs 94. Resource interface 82 additionally sends resource availability description messages to the central resource manager to keep the manager apprised of the availability of IP phone 70 to perform delegated signal processing tasks (122).

When IP phone 70 is capable and available to perform a particular signal processing task, task interface 74 may receive the signal processing task from the central resource manager (124). In addition, LAN interface 90 of IP phone 70 receives a RTP stream that transports communication session data associated with the signal processing task (126). If signaling stack 91 receives or sends a voice call request (YES branch of 128), task manager 76 terminates the signal processing task and task interface 74 sends a message to the central resource manager indicating IP phone 70 is not available for delegated signal processing for the duration of the voice call (130). So long as IP phone 70 does not engage in a voice call, however (NO branch of 128), task manager 76 reads the signal processing task parameters from tasks 78 and directs DSPs 94 to apply signal processing routines stored by algorithms 86 to the RTP stream in accordance with the task parameters (132). Task manager 76 directs the processed stream, as it is processed, to the central resource manager (134). After creating a signal processing task for a communication session (140), task manager 63 queries resource mappings 60 and resource statistics 61 to identify and select a primary DSP re-targetable resource to perform the signal processing task based on statistical usage patterns of the various re-targetable resources in IP telephone system 2 (142). As described with respect to FIG. 4, resource statistics 61 comprises resource availability descriptions for various resources in IP telephone system 2 (e.g., IP phones 16) that includes, for example, a list of previous dates/times in which the resource was unavailable to perform signal processing tasks, as well as other information that might enable CRM 10 of IP-PBX 8 to predict a future availability of the resource to perform signal processing tasks. Task manager 63 analyzes resource statistics 61 using statistical analysis to determine the re-targetable resource that is currently available and is most likely to remain available for the communication session duration. Task manager 63 selects this re-targetable resource as the primary resource.

After selecting a primary resource, task manager 63 performs a similar process to select a backup re-targetable DSP resource based on resource statistics 61 in view of a statistical analysis (144). For example, task manager 63 may analyze resource availability descriptions for various resources in IP telephone system 2 to determine the re-targetable resource that is currently available and is next most likely to remain available for the communication session duration. Task manager 63 selects this re-targetable resource as the backup resource.

Task interface 62 sends the signal processing task to both the primary and backup selected resources (146), and task manager 63 directs proxy 53 to forward, via LAN interface 50, the unprocessed bitstream associated with the communication session to both the primary and backup selected resources (148).

Figure 9:
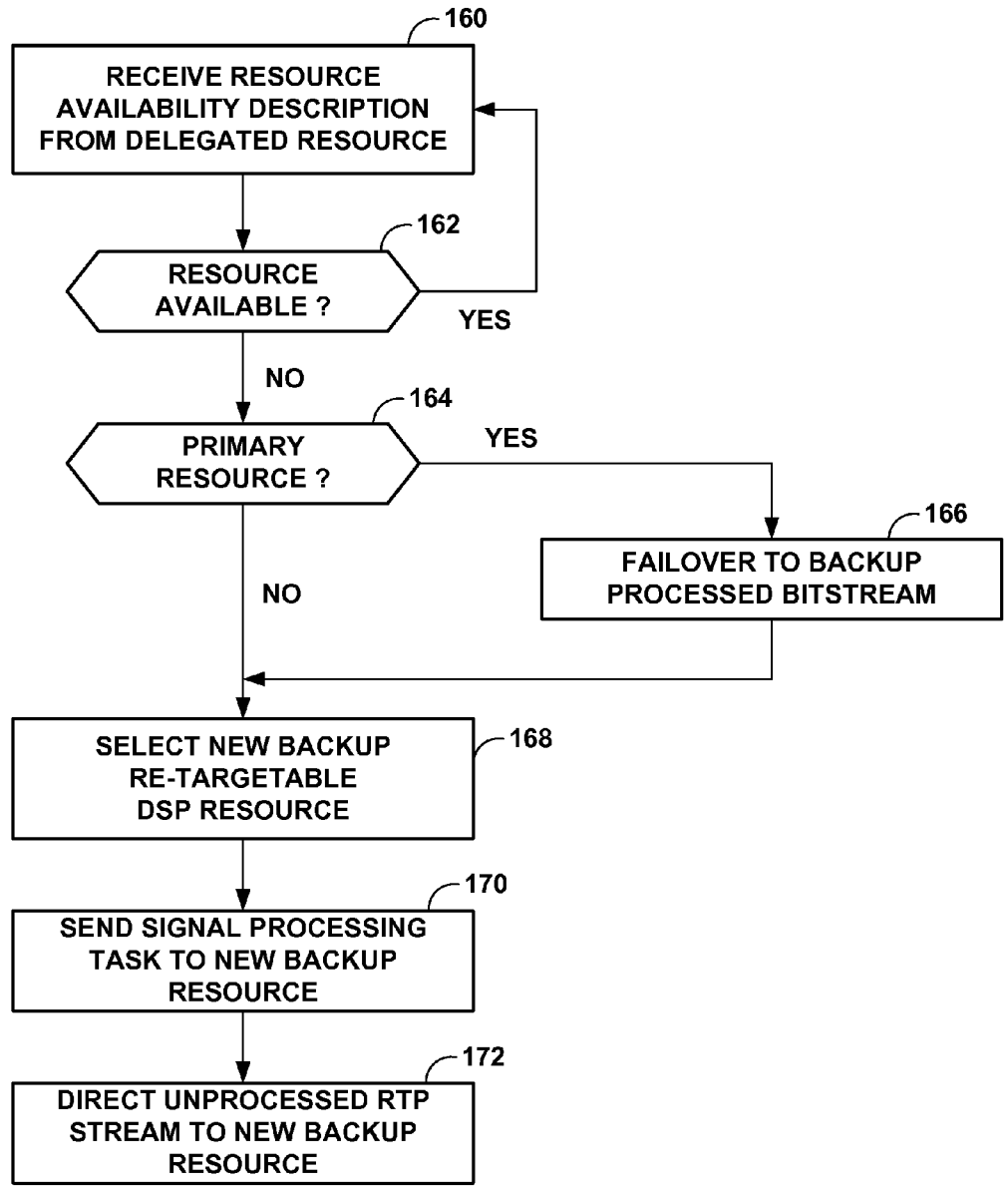
FIG. 9 is a flowchart illustrating an exemplary operation of the exemplary IP-PBX of FIG. 4 for selecting a new re-targetable DSP resource after failure of a previously selected re-targetable DSP resource accoring the techniques described herein.

FIG. 9 is a flowchart illustrating an exemplary operation of exemplary IP-PBX 8 of FIG. 4 for selecting a new re-targetable DSP resource after failure of a previously selected re-targetable DSP resource according the techniques described herein. Initially, resource interface 64 receives an updated resource availability description from a DSP resource to which task manager 63 has delegated a signal processing task for a bitstream of a communication session (160). If the resource availability description indicates the resource remains available (YES branch of 162), task manager 63 takes no action to select another resource. When the resource availability description indicates the resource is no longer available due to, for instance, an error condition or participation of the resource in a communication session (e.g., a voice call) (NO branch of 162), task manager 63 determines whether the resource is the primary resource for the signal processing task (164). If so (YES branch of 164), then task manager 63 re-assigns the backup re-targetable resource as the primary re-targetable resource and, given that the primary processed bitstream is no longer available, switches to the processed bitstream provided by the backup re-targetable resource (166). That is, task manager 63 directs what was previously the backup processed bitstream (and is now the new primary processed bitstream) to the appropriate destination endpoints via LAN interface 50, WAN interface 52, or switch 56.

To retain redundant processing for the signal processing task and the bitstream of the communication session, task manager 63 then queries resource mappings 60 and resource statistics 61 to identify and select a capable, available re-targetable resource to perform the signal processing task as a backup resource (168). Task interface 62 sends the signal processing task to the new backup resource (170), and task manager 63 directs proxy 53 to forward, via LAN interface 50, the unprocessed bitstream associated with the communication session to the new backup resource (172).

The techniques described in this disclosure may be implemented, at least in part, in hardware, software, firmware or any combination thereof on the device management system and the managed devices. For example, various aspects of the described techniques may be implemented as encoded program code executed by one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a tangible computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals or carrier waves, although the term "computer-readable media" may include transient media such as signals, in addition to physical storage media.

Various embodiments of the invention have been described. These and other embodiments are within the scope of the following claims.

The invention claimed is:

1. A method comprising:
receiving, with an internet protocol (IP) telephony device, a signal processing capability description that specifies one or more signal processing capabilities for a first IP telephone digital signal processing (DSP) resource connected to the IP telephony device via a network communication link;
storing the signal processing capability description to the IP telephony device;
receiving, with the IP telephony device, communication session parameters in a signaling protocol message for the communication session, wherein the communication session parameters specify a signal processing requirement for voice data associated with the communication session;
receiving, with the IP telephony device, a bitstream for the communication session that comprises the voice data associated with the communication session;
generating a signal processing task comprising signal processing task parameters that describes the signal processing requirement and identifies the bitstream;
determining, from the signal processing capability description, the first IP telephone DSP resource is capable of performing the signal processing requirement;
based at least on the determination that the first IP telephone DSP resource is capable of performing the signal processing requirement, sending the signal processing task to the first IP telephone DSP resource;
directing the bitstream from the IP telephony device to the first IP telephone DSP resource for processing in accordance with the signal processing task parameters;
receiving, with the IP telephony device, a first processed bitstream generated by the first IP telephone DSP resource in accordance with the signal processing task parameters, wherein the first processed bitstream comprises the voice data processed in accordance with the signal processing task parameters;
sending the first processed bitstream to a destination device for the communication session;
receiving, with the IP telephony device from the first IP telephone DSP resource, a resource request message that includes task parameters that characterize a second signal processing task for a second bitstream; and
sending, from the IP telephony device to the first IP telephone DSP resource, a resource response message that includes a network address of a second IP telephone DSP resource and causes the first IP telephone DSP resource to direct the second bitstream to the second IP telephone DSP resource for processing in accordance with the second signal processing task.

2. The method of claim 1, further comprising:
designating the first IP telephone DSP resource as a primary resource;
determining a second IP telephone DSP resource is capable of performing the signal processing requirement;
designating the second IP telephone DSP resource as a backup resource;
based at least on the determination that the second IP telephone DSP resource is capable of performing the signal processing requirement, sending the signal processing task to the second IP telephone DSP resource;
replicating the bitstream;
directing the replicated bitstream to the second IP telephone DSP resource for processing in accordance with the signal processing task parameters; and
receiving, with the IP telephony device, a second processed bitstream generated by the second IP telephone DSP resource in accordance with the signal processing task parameters, wherein the second processed bitstream comprises the voice data processed in accordance with the signal processing task parameters.

3. The method of claim 2, further comprising:
receiving a resource availability description from the first IP telephone DSP resource indicating a failure of the first IP telephone DSP resource; and
sending the second processed bitstream to the destination device for the communication session.

4. The method of claim 1, wherein determining, from the signal processing capability description, the first IP telephone DSP resource is capable of performing the signal processing requirement comprises identifying a codec in the signal processing capability description to perform the signal processing requirement.

5. The method of claim 1, further comprising:
storing one or more signal processing routines on the IP telephony device,
wherein determining, from the signal processing capability description, the first IP telephone DSP resource is capable of performing the signal processing requirement comprises selecting one of the stored signal processing routines to perform the signal processing requirement and sending the selected signal processing routine to the first IP telephone DSP resource.

6. The method of claim 1, further comprising:
receiving, with the IP telephony device, a resource availability description from the first IP telephone DSP resource that specifies whether the first IP telephone DSP resource is available to perform a signal processing task; and
storing the resource availability description.

7. The method of claim 6, further comprising:
generating statistical usage data for the first IP telephone DSP resource using the resource availability description; and
determining the first IP telephone DSP resource is available to perform a signal processing task by analyzing the statistical usage data and predicting a future availability for the first IP telephone DSP resource.

8. The method of claim 1, wherein the signaling protocol message comprises a request for the communication session with an IP telephone, the method further comprising:
advertising, with the IP telephony device, a network address for the IP telephony device as a destination address for the IP telephone,
wherein the bitstream is addressed to the IP telephony device.

9. The method of claim 1, wherein the IP telephony device is an IP private branch exchange (IP-PBX) that comprises a time-division multiplexing (TDM) gateway communicatively coupled to a legacy TDM-phone via a switch.

10. The method of claim 9, wherein sending the first processed bitstream to the destination device for the communication session comprises sending the first processed bitstream to the legacy TDM-phone via the switch.

11. The method of claim 1, wherein the IP telephony device is an IP telephone.

12. The method of claim 1, wherein the signal processing requirement is selected from the group consisting of transcoding, silence suppression, echo cancellation, and conference mixing.

13. A method comprising:
sending a signal processing capability description that specifies one or more signal processing capabilities for an Internet Protocol (IP) telephone from the IP telephone to an IP telephony device via a network communication link;
receiving, with the IP telephone, a signal processing task having signal processing task parameters that identifies a bitstream that comprises voice data and describes a signal processing requirement for the bitstream;
receiving the bitstream with the IP telephone;
applying one of the signal processing capabilities of the IP telephone to perform the signal processing requirement for the bitstream to generate a processed bitstream that comprises the voice data processed in accordance with the signal processing task parameters;
outputting the processed bitstream;
sending, from the IP telephone to the IP telephony device, a resource request message that includes task parameters to characterize a second signal processing task for a second bitstream;
receiving, by the IP telephone from the IP telephony device, a resource response message that includes a network address of another IP telephone; and
receiving, with the IP telephone, the second bitstream and redirecting the second bitstream to the other IP telephone for processing in accordance with the second signal processing task.

14. The method of claim 13, further comprising:
receiving, with the IP telephone, a signaling protocol message for a communication session setup exchange, wherein the IP telephone is an endpoint of the communication session;
responsive to receiving the signaling protocol message, establishing the communication session; and
responsive to establishing the communication session, sending a resource availability description specifying that the IP telephone is not available to perform the signal processing task from the IP telephone to the IP telephony device.

15. The method of claim 13, wherein outputting the processed bitstream comprises outputting the processed bitstream from the IP telephone to the IP telephony device via the network communication link.

16. The method of claim 13, wherein outputting the processed bitstream comprises outputting the processed bitstream from the IP telephone to another IP telephone that is a destination for a communication session associated with the bitstream.

17. An Internet Protocol (IP) telephony device comprising:
a central resource manager having a set of one or more resource mappings;
a network interface;
a resource interface to receive a signal processing capability description that specifies one or more signal processing capabilities for a first IP telephone digital signal processing (DSP) resource connected to the IP telephony device via a network communication link, wherein the resource interface stores the signal processing capability description to the set of resource mappings;
a call agent having a signaling stack to receive communication session parameters in a signaling protocol message for the communication session, wherein the communication session parameters specify a signal processing requirement for voice data associated with the communication session;
a data stream stack to receive, via the network interface, a bitstream for the communication session that comprises the voice data associated with the communication session;
a task manager to generate a signal processing task comprising signal processing task parameters that describes the signal processing requirement and identifies the bitstream, wherein the task manager uses the signal processing capability description stored to the set of resource mappings to determine the first IP telephone DSP resource is capable of performing the signal processing requirement; and
a task interface to, based at least on the determination that the first IP telephone DSP resource is capable of performing the signal processing requirement, send the signal processing task to the first IP telephone DSP resource,
wherein the task manager directs the bitstream to the first IP telephone DSP resource via the network interface for processing in accordance with the signal processing task parameters,
wherein the data stream stack receives, via the network interface, a first processed bitstream generated by the first IP telephone DSP resource in accordance with the signal processing task parameters, wherein the first processed bitstream comprises the voice data processed in accordance with the signal processing task parameters, and
wherein the task manager directs the first processed bitstream to a destination device for the communication session.
wherein the task interface receives, from the first IP telephone DSP resource, a resource request message that includes task parameters to characterize a second signal processing task for a second bitstream, and
wherein the task interface sends, to the first IP telephone DSP resource, a resource response message that includes a network address of a second IP telephone DSP resource and causes the first IP telephone DSP resource to direct the second bitstream to the second IP telephone DSP resource for processing in accordance with the second signal processing task.

18. The IP telephony device of claim 17, wherein the task manager determines the first IP telephone DSP resource is capable of performing the signal processing requirement by identifying a codec in signal processing capability description stored to the set of resource mappings to perform the signal processing requirement.

19. The IP telephony device of claim 17, further comprising:
an algorithm library to store one or more signal processing routines,
wherein the task manager determines the first IP telephone DSP resource is capable of performing the signal processing requirement by selecting one of the stored signal processing routines to perform the signal processing requirement and directs the resource interface to send the selected signal processing routine to the first IP telephone DSP resource.

20. The IP telephony device of claim 17, further comprising:
a set of one or more resource statistics to describe an availability of the first IP telephone DSP resource,
wherein the resource interface receives a resource availability description from the first IP telephone DSP resource that specifies whether the first IP telephone DSP resource is available to perform a signal processing task.

21. The IP telephony device of claim 17,
wherein the task manager generates statistical usage data for the first IP telephone DSP resource using the resource availability description, and
wherein the task manager determines the first IP telephone DSP resource is available to perform a signal processing task by analyzing the statistical usage data and predicting a future availability for the first IP telephone DSP resource.

22. The IP telephony device of claim 17, wherein the IP telephony device is an IP private branch exchange (IP-PBX) and further comprises:
a switch; and
a time-division multiplexing (TDM) gateway communicatively coupled to a legacy TDM-phone.

23. The IP telephony device of claim 17, wherein the IP telephony device comprises an IP telephone.

24. An Internet Protocol (IP) telephone comprising:
a central resource manager interface having a resource interface to send a signal processing capability description that specifies one or more signal processing capabilities for the IP telephone from the IP telephone to an IP telephony device via a network communication link;
a task interface to receive a signal processing task having signal processing task parameters that identifies a bitstream that comprises voice data and describes a signal processing requirement for the bitstream;
a network interface;
a data stream stack to receive, via the network interface, the bitstream;
a task manager; and
a digital signal processing resource that executes an algorithm to apply one of the signal processing capabilities of the IP telephone to perform the signal processing requirement for the bitstream to generate a processed bitstream, wherein the processed bitstream comprises the voice data processed in accordance with the signal processing task parameters,
wherein the task manager directs the data stream stack to output, via the network interface, the processed bitstream,
wherein the task interface sends, to the IP telephony device, a resource request message that includes task parameters to characterize a second signal processing task for a second bitstream, wherein the task interface receives, from the IP telephony device, a resource response message that includes a network address of another IP telephone, and wherein the data stream stack receives, via the network interface, the second bitstream and the task manager directs the data stream stack to redirect the second bitstream to the other IP telephone for processing in accordance with the second signal processing task.

25. The IP telephone of claim 24, further comprising:

a call agent having a signaling stack to receive a signaling protocol message for a communication session setup exchange, wherein the IP telephone is an endpoint of the communication session, wherein the call agent establishes the communication session responsive to receiving the signaling protocol, wherein the resource interface, responsive to the call agent establishing the communication session, sends a resource availability description specifying that the IP telephone is not available to perform the signal processing task from the IP telephone to the IP telephony device.

26. The IP telephone of claim 24, wherein the data stream stack outputs, via the network interface, the processed bitstream from the IP telephone to the IP telephony device.

27. The IP telephone of claim 24, wherein the data stream stack outputs, via the network interface, the processed bitstream from the IP telephone to another IP telephone that is a destination for a communication session associated with the bitstream.

28. The IP telephone of claim 24, further comprising:

wherein the resource interface receives a signal processing routine from the IP telephony device and, and wherein, to execute an algorithm to apply one of the signal processing capabilities, the digital signal processing resource executes the signal processing routine received from the IP telephony device.

29. A system comprising:

an Internet Protocol (IP) telephone;

an IP private branch exchange (IP-PBX) comprising:

a central resource manager having a set of one or more resource mappings;

a first network interface;

a first resource interface to receive a signal processing capability description that specifies one or more signal processing capabilities for the IP telephone connected to the IP-PBX via a network communication link, wherein the first resource interface stores the signal processing capability description to the set of resource mappings;

a call agent having a signaling stack to receive communication session parameters in a signaling protocol message for the communication session, wherein the communication session parameters specify a signal processing requirement for voice data associated with the communication session;

a first data stream stack to receive, via the first network interface, a bitstream for the communication session that comprises voice data for the communication session;

a first task manager to generate a signal processing task comprising signal processing task parameters that describes the signal processing requirement and identifies the bitstream, wherein the first task manager uses the signal processing capability description stored to the set of resource mappings to determine the IP telephone is capable of performing the signal processing requirement; and a first task interface to, based at least on the determination that the IP telephone is capable of performing the signal processing requirement, send the signal processing task to the IP telephone for processing in accordance with the signal processing task parameters, wherein the first task manager directs the bitstream to the IP telephone via the first network interface, wherein the first data stream stack receives, via the first network interface, a processed bitstream generated by the IP telephone in accordance with the signal processing task parameters, wherein the processed bitstream comprises the voice data processed in accordance with the signal processing task parameters, and wherein the first task manager directs the processed bitstream to a destination device for the communication session, wherein the IP telephone comprises:

a central resource manager interface having a second resource interface to send the signal processing capability description to the IP-PBX via the network communication link;

a second task interface to receive the signal processing task;

a second network interface;

a second data stream stack to receive, via the second network interface, the bitstream;

a second task manager; and a digital signal processing resource that executes an algorithm to apply one of the signal processing capabilities of the IP telephone to perform the signal processing requirement for the bitstream to generate the processed bitstream, wherein the second task manager directs the second data stream stack to output, via the second network interface, the processed bitstream to the IP-PBX, wherein the second task interface sends, to the IP telephony device, a resource request message that includes task parameters to characterize a second signal processing task for a second bitstream, wherein the second task interface receives, from the IP telephony device, a resource response message that includes a network address of another IP telephone, and wherein the second data stream stack receives, via the second network interface, the second bitstream and the second task manager directs the second data stream stack to redirect the second bitstream to the other IP telephone for processing in accordance with the second signal processing task.

* * * * *